United States Patent [19]
Iwasaki et al.

[11] Patent Number: 4,879,646
[45] Date of Patent: Nov. 7, 1989

[54] DATA PROCESSING SYSTEM WITH A PIPELINED STRUCTURE FOR EDITING TRACE MEMORY CONTENTS AND TRACING OPERATIONS DURING SYSTEM DEBUGGING

[75] Inventors: Junichi Iwasaki; Hisao Harigai, both of Tokyo, Japan

[73] Assignee: NEC Corporation, Tokyo, Japan

[21] Appl. No.: 39,900

[22] Filed: Apr. 20, 1987

[30] Foreign Application Priority Data

Apr. 18, 1986 [JP]   Japan ..................... 61-90702

[51] Int. Cl.⁴ .............. G06F 9/38; G06F 11/22; G06F 11/26; G06F 11/28
[52] U.S. Cl. .................. 364/200; 364/231.8; 364/274; 364/274.1; 364/275.1; 364/275.5; 364/276.5; 364/276.9; 364/285; 364/285.3; 364/285.4; 371/16.5; 371/19
[58] Field of Search ............ 364/900, 200, 300; 371/12, 16, 19

[56] References Cited

U.S. PATENT DOCUMENTS

| 4,390,946 | 6/1983 | Lane ..................... 364/200 |
| 4,430,706 | 2/1984 | Sand ..................... 364/200 |
| 4,477,872 | 10/1984 | Losq et al. ............ 364/200 |

FOREIGN PATENT DOCUMENTS

| 54-105939 | 8/1979 | Japan ..................... 371/19 |
| 55-146824 | 5/1982 | Japan ..................... 371/19 |
| 56-140931 | 3/1983 | Japan ..................... 371/19 |
| 56-140932 | 3/1983 | Japan ..................... 371/19 |
| 58-181152 | 10/1983 | Japan ..................... 371/19 |

OTHER PUBLICATIONS

"Error Tracing Arrangement of a Pipeline Processor," IBM Technical Disclosure Bulletin, vol. 28, No. 2, Jul. 1985, pp. 621–624.

Primary Examiner—Archie E. Williams, Jr.
Assistant Examiner—Robert B. Harrell
Attorney, Agent, or Firm—Foley & Lardner, Schwartz, Jeffery, Schwaab, Mack, Blumenthal & Evans

[57] ABSTRACT

A microprocessor having a multi-stage pipeline structure, comprises: a status flip-flop having its output changing when the instruction code of a predetermined instruction is decoded in the microprocessor; a circuit for outputting the output of the status flip-flop in synchronism with the output timing of an address for the bus cycle period of the microprocessor; and a circuit for sequentially storing the information, which appears at the input/output terminals of the microprocessor, as time-series data outside of the microprocessor. The time-series data is edited by discriminating the bus cycle of the microprocessor belongs to the bus cycle following an instruction on or before the predetermined instruction for changing the output of the status flip-flop or the bus cycle following an instruction on or after the predetermined instruction, with reference to the information outputted from the status flip-flop inside of the microprocessor to the outside of the same.

10 Claims, 12 Drawing Sheets

| FRAME | ADDR | BHE* | STS | QSTS | QDEPTH | DMUX | MARK | EXT | PROBE |
|---|---|---|---|---|---|---|---|---|---|
| 0001: | 2EABAH | 0 | F | N | 2 | D | 0 | 11111111 | 1111 |
| 0002: | 2EABAH | 0 | F | E | 0 | Q | 0 | 11111111 | 1111 |
| 0003: | FF39EH | 0 | F | N | 0 | A | 0 | 11111111 | 1111 |
| 0004: | 2EABAH | 0 | F | N | 2 | D | 0 | 11111111 | 1111 |
| 0005: | FF3A0H | 0 | F | N | 2 | A | 0 | 11111111 | 1111 |
| 0006: | FF3A0H | 0 | F | F | 2 | Q | 0 | 11111111 | 1111 |
| 0007: | FF3A0H | 0 | F | S | 2 | Q | 0 | 11111111 | 1111 |
| 0008: | 2ECFFH | 0 | F | N | 2 | D | 0 | 11111111 | 1111 |
| 0009: | FF3A2H | 0 | F | N | 2 | A | 0 | 11111111 | 1111 |
| 0010: | FF3A2H | 0 | F | S | 2 | Q | 0 | 11111111 | 1111 |
| 0011: | FF3A2H | 0 | F | F | 2 | Q | 0 | 11111111 | 1111 |
| 0012: | 207A8H | 0 | F | N | 2 | D | 0 | 11111111 | 1111 |
| 0013: | 0FFEAH | 1 | I | N | 2 | A | 0 | 11111111 | 1111 |
| 0014: | 2FF00H | 1 | I | N | 2 | D | 0 | 11111111 | 1111 |
| 0015: | FF3A4H | 0 | F | F | 1 | A | 0 | 11111111 | 1111 |
| 0016: | FF3A4H | 0 | F | S | 2 | Q | 0 | 11111111 | 1111 |
| 0017: | 2F874H | 0 | F | N | 2 | D | 0 | 11111111 | 1111 |
| 0018: | FF3A6H | 0 | F | N | 2 | A | 0 | 11111111 | 1111 |
| 0019: | FF3A6H | 0 | F | F | 2 | Q | 0 | 11111111 | 1111 |
| 0020: | FF3A6H | 0 | F | S | 2 | Q | 0 | 11111111 | 1111 |
| 0021: | 2EABAH | 0 | F | N | 2 | D | 0 | 11111111 | 1111 |
| 0022: | 2EABAH | 0 | F | E | 0 | Q | 0 | 11111111 | 1111 |
| 0023: | FF39EH | 0 | F | N | 0 | A | 0 | 11111111 | 1111 |
| 0024: | 2EABAH | 0 | F | N | 2 | D | 0 | 11111111 | 1111 |
| 0025: | FF3A0H | 0 | F | N | 2 | A | 0 | 11111111 | 1111 |
| 0026: | FF3A0H | 0 | F | F | 2 | Q | 0 | 11111111 | 1111 |
| 0027: | FF3A0H | 0 | F | S | 2 | Q | 0 | 11111111 | 1111 |
| 0028: | 2ECFFH | 0 | F | N | 2 | D | 0 | 11111111 | 1111 |
| 0029: | FF3A2H | 0 | F | N | 2 | A | 0 | 11111111 | 1111 |
| 0030: | FF3A2H | 0 | F | S | 2 | Q | 0 | 11111111 | 1111 |
| 0031: | FF3A2H | 0 | F | F | 2 | Q | 0 | 11111111 | 1111 |
| 0032: | 207A8H | 0 | F | N | 2 | D | 0 | 11111111 | 1111 |
| 0033: | 0FFEAH | 1 | I | N | 2 | A | 0 | 11111111 | 1111 |

FIGURE 5A    PRIOR ART

| | | | | | | | | |
|---|---|---|---|---|---|---|---|---|
| 0034: | 2FF00H | 1 | I | N | 2 | D | 0 | 11111111 1111 |
| 0035: | FF3A4H | 0 | F | F | 1 | A | 0 | 11111111 1111 |
| 0036: | FF3A4H | 0 | F | S | 2 | Q | 0 | 11111111 1111 |
| 0037: | 2F874H | 0 | F | N | 2 | D | 0 | 11111111 1111 |
| 0038: | FF3A6H | 0 | F | N | 2 | A | 0 | 11111111 1111 |
| 0039: | FF3A6H | 0 | F | F | 2 | Q | 0 | 11111111 1111 |
| 0040: | FF3A6H | 0 | F | S | 2 | Q | 0 | 11111111 1111 |
| 0041: | 2EABAH | 0 | F | N | 2 | D | 0 | 11111111 1111 |
| 0042: | 2EABAH | 0 | F | E | 0 | Q | 0 | 11111111 1111 |
| 0043: | FF39EH | 0 | F | N | 0 | A | 0 | 11111111 1111 |
| 0044: | 2EABAH | 0 | F | N | 2 | D | 0 | 11111111 1111 |
| 0045: | FF3A0H | 0 | F | N | 2 | A | 0 | 11111111 1111 |
| 0046: | FF3A0H | 0 | F | F | 2 | Q | 0 | 11111111 1111 |
| 0047: | FF3A0H | 0 | F | S | 2 | Q | 0 | 11111111 1111 |
| 0048: | 2ECFFH | 0 | F | N | 2 | D | 0 | 11111111 1111 |
| 0049: | FF3A2H | 0 | F | N | 2 | A | 0 | 11111111 1111 |
| 0050: | FF3A2H | 0 | F | S | 2 | Q | 0 | 11111111 1111 |
| 0051: | FF3A2H | 0 | F | F | 2 | Q | 0 | 11111111 1111 |
| 0052: | 207A8H | 0 | F | N | 2 | D | 0 | 11111111 1111 |
| 0053: | 0FFEAH | 0 | I | N | 2 | A | 0 | 11111111 1111 |
| 0054: | 2FF00H | 1 | I | N | 2 | D | 0 | 11111111 1111 |
| 0055: | FF3A4H | 0 | F | F | 1 | A | 0 | 11111111 1111 |
| 0056: | FF3A4H | 0 | F | S | 2 | Q | 0 | 11111111 1111 |
| 0057: | 2H874H | 0 | F | N | 2 | D | 0 | 11111111 1111 |
| 0058: | FF3A6H | 0 | F | N | 2 | A | 0 | 11111111 1111 |
| 0059: | FF3A6H | 0 | F | F | 2 | Q | 0 | 11111111 1111 |
| 0060: | FF3A6H | 0 | F | S | 2 | Q | 0 | 11111111 1111 |
| 0061: | 2EABAH | 0 | F | N | 2 | D | 0 | 11111111 1111 |

FIGURE 5B
PRIOR ART

| FRAME | ADDR | MNEMONIC | OPERANDS | COMMENT |
|---|---|---|---|---|
| 0006: | FF39EH | MOV | DX,FFEAH | |
| 0011: | FF3A1H | IN | AL,DX | |
| | | | | |
| 0015: | FF3A2H | TEST | AL,07H | |
| 0019: | FF3A4H | JE | $-06H | ; SHORT |
| 0026: | FF39EH | MOV | DX,FFEAH | |
| 0031: | FF3A1H | IN | AL,DX | |
| | | | | |
| 0035: | FF3A2H | TEST | AL,07H | |
| 0039: | FF3A4H | JE | $-06 | ; SHORT |
| 0046: | FF39EH | MOV | DX,FFEAH | |
| 0051: | FF3A1H | IN | AL,DX | |
| | | | | |
| 0055: | FF3A2H | TEST | AL,07H | |
| 0059: | FF3A4H | JE | $-06H | ; SHORT |
| 0066: | FF39EH | MOV | DX,FFEAH | |
| 0071: | FF3A1H | IN | AL,DX | |
| | | | | |
| 0075: | FF3A2H | TEST | AL,07H | |
| 0079: | FF3A4H | JE | $-06H | ; SHORT |
| 0086: | FF39EH | MOV | DX,FFEAH | |
| 0091: | FF3A1H | IN | AL,DX | |
| | | | | |
| 0095: | FF3A2H | TEST | AL,07H | |
| 0099: | FF3A4H | JE | $-06H | ; SHORT |
| 0106: | FF39EH | MOV | DX,FFEAH | |
| 0111: | FF3A1H | IN | AL,DX | |
| | | | | |
| 0115: | FF3A2H | TEST | AL,07H | |
| 0119: | FF3A4H | JE | $-06H | ; SHORT |
| 0126: | FF39EH | MOV | DX,FFEAH | |
| 0131: | FF3A1H | IN | AL,DX | |

```
----
L1    MOV   M10,M11    ; I1
L2    MOV   R2,M21     ; I2
L3    MOV   R3,M31     ; I3
L4    JUMP  ADR60      ; JUMP
L5    MOV   M50,M51    ; I5
------------
L6    MOV   R6,M61     ; I6
L7    MOV   M70,R7     ; I7
```

FIGURE 12

| ADR10 | OPCD10 |
| ADR11 | OPCD11 |
| ADR20 | OPCD20 |
| ADR21 | OPCD21 |
| ADR30 | OPCD30 |
| ADR31 | OPCD31 |
| ADR40 | OPCD40 |
| ADR41 | OPCD41 |
| ADR50 | OPCD50 |
| ADR51 | OPCD51 |
| ADR60 | OPCD60 |
| ADR61 | OPCD61 |
| ADR70 | OPCD70 |
| ADR71 | OPCD71 |

DATA PROCESSING SYSTEM WITH A PIPELINED STRUCTURE FOR EDITING TRACE MEMORY CONTENTS AND TRACING OPERATIONS DURING SYSTEM DEBUGGING

BACKGROUND OF THE INVENTION

1. Field of the Invention

The present invention relates to an information processing system and, more particularly, to an information processing system having a function either to restore the mnemonic of an instruction having been executed in a processor such as a microprocessor, which is integrated on a semiconductor chip, in the execution order from the informations appearing at (e.g., inputted to or outputted from) chip terminals such as the address bus terminal and data bus terminal of the processor, or to restore (or trace the instruction) both the addresses accessed actually as an operand by the processor in accordance with the mnemonic instruction and the data of that address in case the executed instruction has the operand outside of the processor. The information processing system is effective for debugging the software to be developed by the processor.

2. Description of related art

A first description to be made is directed to the internal structure of a microprocessor having a precedence control function of an instruction, especially to the pre-fetch control of an instruction code, a queue status and a bus status. A next description will be made on how the microprocessor of the prior art uses the queue status and the bus status to execute an instruction trace. A further description will be made on the internal structure of a multi-function microprocessor having a multistage pipeline structure developed from the aforementioned microprocessor of the prior art and on the drawbacks in case the aforementioned instruction trace is executed by that multifunction microprocessor.

In the microprocessor of the prior art in which all the basic operation sequences of the microprocessor: instruction code fetch —instruction decoding —operand access —instruction execution —operand access are sequentially conducted, the instruction trace can be performed merely by sequentially following the informations appearing in the address bus terminal and the data terminal while the microprocessor is executing a series of instructions. On the other hand, in a microprocessor of the type in which the instruction code fetch of the aforementioned basic operation sequences of the microprocessor is assigned to an independent unit so that it may be controlled in precedence, the informations appearing during the processing of a series of instructions of the microprocessor at the address bus terminal, the data bus terminal and the output terminal of a status signal indicating the internal status of the instruction code fetching unit are once latched as time-series data in the trace buffer memory. Both the instruction code fetched in the processor by the instruction code fetch controlled in precedence and the subsequent execution result of that instruction code are edited correspondingly by the status signal so that the instruction trace can be conducted. Thus, according to the instruction tracing method of the microprocessor, the informations appearing at the terminals of the microprocessor are traced. As a result, if the internal structure of the microprocessor is changed so as to conduct the precedence control of the aforementioned instruction code fetch, it accordingly becomes necessary to output the minimum necessary information indicating the internal status for the instruction trace from the minimum number of terminals and to change the instruction tracing method itself.

FIG. 4 is a block diagram showing the internal structure of a processor according to the prior art. Reference numeral 401 designates a processor chip, and numeral 402 designates a bus terminal through which addresses and data are inputted and outputted. Numeral 403 designates an internal bus; numeral 404 a data register, numeral 405 an address generator; and number 406 an instruction queue and its control of 6 bytes. The queue status information of the processor 401 is generated by the instruction queue control 406 and is outputted to the outside of the processor 401. An instruction code issued from the instruction queue 406 is transferred to and latched by an instruction latch 411 through a signal line 408 and an internal data bus 409. Numeral 412 designates an instruction code decoder which is made receptive of the output of the instruction latch 411. Numeral 410 designates an instruction execution control. Numerals 413, 414 and 415 designate various registers, an arithmetic and logical unit (i.e., ALU), and an operand register for the ALU, respectively. Numeral 416 designates a bus control for controlling the bus cycles of the processor 401, the generation of a bus status signal, and so on. Numeral 417 designates a signal line for outputting therethrough the bus status signal generated by the bus control 416 to the outside of the processor 401.

The instruction coding/pre-fetching, decoding and executing operations of the processor 401 will be described with reference to FIG. 4.

In the instruction coding/pre-fetching operations of the processor 401, a pre-fetching address generated by the address generator 405 is outputted through the bus terminal 402 to a not-shown system address bus, and an instruction code outputted from a corresponding area in a not-shown memory to a not-shown system data bus is fetched from the bus terminal 402 and is latched through the internal bus 403 in the trailing block of the instruction queue 406 having the FIFO (i.e., First In First Out) structure. Here, if the data bus of the processor 401 has a length of 16 bits, a 2-byte (i.e., 1 byte=8 bits) instruction code can be stored in the instruction queue 406 by a single instruction coding/pre-fetching operation.

The processor 401 latches a 1-byte instruction code per instruction sequentially from the head of the instruction queue 408 in the instruction latch 411 through the signal line 408 and the internal bus 409 and uses the instruction decoder 412 to decode that instruction code. The control information generated as the decoding result is transferred to the instruction execution control or the like so that the operation described in the instruction code decoded by the decoder 412 is instantly executed. When the execution of this operation is completed, the processor 401 repeats the sequence of fetching a subsequent one instruction code from the instruction queue 412 into the instruction latch 411 and decoding and executing it.

For example, in the case where a read operand is required in the memory as a result that the instruction code fetched from the instruction queue 406 and latched in the instruction latch 411 is decoded by the decoder 412, it is first read out from the memory after the decoding of the instruction code. The instruction execution control 410 gives the address generator 405 the information necessary for generating the address of the read operand in the memory and then commands the start of the memory read bus cycle. In response to this command from the instruction execution control 410, the bus control 416 uses the address generated by the address generator 405 to start the memory read bus cycle, stores the data obtained from the memory in the data register 404, and transmits it to the instruction execution control 410 that the memory read has been completed. The instruction execution control 410 uses the content of the data register 404 to perform the necessary processing, when it receives from the bus control 416 the information of the memory read completion responding to the memory read bus cycle starting command issued previously. As a result, the bus control 416 cannot execute the instruction because the memory read bus cycle commanded by the instruction execution control 410 cannot be started, although it receives from the bus control 416 the memory read bus cycle starting command from the instruction execution control 410, provided that the system data bus and the system address bus are occupied by another bus master or the like. This instruction execution is deferred until the bus control 416 acquires the using right of the system data bus and the system address bus to start the memory read bus cycle and to fetch the data from a predetermined area in the memory and write it in the data register. In other words, the actual bus cycle of this processor 401 for the memory of I/O access of an instruction requiring this access is restricted while the instruction is being executed.

A software has to be debugged by tracing the instruction so that it may be developed by using the processor described above. The instruction tracing is one of the useful techniques for the software development and for obtaining information necessary for examining: what result is obtained when a certain instruction is executed by a CPU; what influence is exerted as a result of execution of one instruction upon subsequent instructions; what influence is exerted upon an instruction program being executed in case an external interruption is made while one instruction or routine is being executed; and so on.

Since the processor is enabled to pre-fetch the instruction code, as described above, the timing at which the instruction fetched through the data I/O terminal of the processor in the processor is to be executed depends upon the internal status of the processor. This processor is enabled to output queue status signals QS0 and QS1 representing the statuses of the instruction queue and bus status signals S0 to S2 representing the kinds of the bus cycle. As a result, the statuses of the instruction queue are understood from the queue status signals, as listed in Table 1, and the kinds of the bus cycle are understood from the bus status signals, as listed in Table 2, as follows:

TABLE 1

| Q1 | Q0 | | Symbol |
|---|---|---|---|
| 0 | 0 | Queue without Fluctuation | N |
| 0 | 1 | Queue at 1st Byte of Instruction code | F |
| 1 | 0 | Queue Empty | E |
| 1 | 1 | Queue at or after 2nd Byte | S |

TABLE 2

| S2 | S1 | S0 | | Symbol |
|---|---|---|---|---|
| 0 | 0 | 0 | Interrupt Acknowledge | IA |

TABLE 2-continued

| S2 | S1 | S0 | | Symbol |
|---|---|---|---|---|
| 0 | 0 | 1 | Read I/O Port | I |
| 0 | 1 | 0 | Write I/O Port | O |
| 0 | 1 | 1 | Halt | HLT |
| 1 | 0 | 0 | Code Access | F |
| 1 | 0 | 1 | Read Memory | RM |
| 1 | 1 | 0 | Write Memory | WM |
| 1 | 1 | 1 | Passive | P |

The information of a trace buffer memory in an instruction tracer is edited by realizing a pseudo instruction queue having the same action as that of the instruction queue in the processor by means of the software of the instruction tracer and by inversely assembling an instruction code in the trace buffer memory in the actual processing order of the processor with reference to the status of the pseudo instruction queue to establish an instruction mnemonic while simulating the instruction queue in the processor in accordance with the advance of the processing on the basis of the queue status signal and bus status signal of each address of time-series data in the trace buffer memory. In case, moreover, the instruction executed is one accompanied by a memory access or an I/O access, it is necessary to inversely assemble the instruction code to establish the instruction mnemonic and also to determine what address and data are actually used to conduct the memory access or the I/O access.

The instruction tracer of the aforementioned processor has the flowing major functions: a trace buffer memory function to store the address bus information and data bus information being executed by the processor, and the control signal status information; a break point setting function; a queue status emulating function; and a function to editing the information in the trace buffer memory. While the processor is executing the program, the instruction tracer sequentially fetches those predetermined ones of data and signals in the trace buffer memory, which appear at the individual buses and input/output signal terminals as the execution progresses. The trace buffer memory being implemented at the present has one word of about 64 bits and a capacity of about 64 words to 2 kilo-words. The user is enabled by interrupting the execution of the program at a break point set by the break point setting function and then by checking the software developed in view of the result of edition of the information in the trace buffer memory.

Here, since the processor has the pre-fetching function, the instruction inputted through the data bus terminal is not directly decoded/executed but once fetched in the instruction queue and caused to wait. This wait is not constant because it depends upon the jam of the instruction queue, the kind of the instruction being executed, and so on. In the case of the processor being described, the status of the instruction queue and the kind of the bus cycle at present can be outputted as the queue status information QS0 and QS1 and the bus status information S0 and S2, respectively, from the terminal to the outside. As a result, the instruction tracer fetches the queue status and bus status signals together with another information in the trace buffer memory and refers them, after it interrupts the program at the break point, to edit not only the information stored as the time-series data in the trace buffer memory but also what address's instruction code is to be decoded or executed and what memory access in the trace buffer memory the memory or I/O access established in that procedure corresponds to.

The principle of this edition will be briefly described in the following. In case one instruction is fetched from the instruction queue and is being decoded and executed, the execution of a subsequent instruction is deferred until the instruction being executed is completed. As a result, even if the instruction accompanied by the memory or the I/O access is two succeeding ones, for example, their order of the memory or the I/O access is identical to that of the instructions written in the program. Moreover, the difference between the time at which the instruction accompanied by the memory or the I/O access is fetched from the memory and the time of the memory access at which it is fetched from the instruction queue and is decoded and executed depends upon the status of the instruction queue, but the time of the memory or the I/O access coincides with that at which the instruction is executed. With these prerequisites, the trace buffer memory will be described in the following.

FIG. 5A and 5B present one example of the data which are written in the trace buffer memory. Each frame corresponds to each address of the trace buffer memory, at which the information of one word to be once fetched in each frame is written. The frames are numbered in the order of their having been fetched in the trace buffer memory. Letters BHE* designate a byte high enable signal, and the asterisk * designates an active low status. The BHE* signal indicates that data are outputted to the higher half of the data bus. Letters STS designate the bus status signals S0 to S2 in the symbols listed in Table 2. Letters Q0T0 designate the queue status signal QS1 and QS0 in the symbols listed in Table 1. Letters QDEPTH designate the number of the bytes of the instruction codes stored in the instruction queue. Letters DMUX represent what purpose the trace buffer memory fetches for. Letters A, D and Q designate an address, a data and a status, respectively. A bus cycle similar to that of the processor is assigned to the instruction tracer so that the tracer monitors the trace data such as the address, the data or the status for each system clock of the processor. Since the address changes in a bus cycle T1, the trace data of one word is fetched at the cycle T1 in the trace buffer memory. At this time, the address A is written in the DMUX. Since the data at the address outputted at T1 is fixed in an identical bus cycle T4, one frame is fetched in the trace buffer memory at T4. At this time, the data D is written in the DMUX. The bus status is effective for a time period of bus cycles from T2 to T4. The bus status fetched in the trace buffer memory immediately before that period is fetched one frame in the trace buffer memory only in case its content changes. The queue status does not depend on the bus cycle basically, but the trace data fetched immediately before in the trace buffer memory is fetched one word only in case its queue status content changes. When the status is fetched, the status Q is written in the DMUX. In this processor, all the address data and status are received in a time-series manner at the common terminal and are multiplexed. This makes it necessary to provide an index such as the DMUX so that the address (A), the data (D) or the status (Q) may be discriminated. The QDEPTH is not the information obtained directly from the terminal of the processor but is calculated from the queue status (QSTS) and the bus status (STS) in the following manner.

Incidentally, there are several pseudo instruction queue framing methods, one of which will be described with reference to FIG. 6. Reference numeral 601 designates a memory space having a length of 1 byte, which is sufficient for retaining the instruction trace. In the processor, the instruction code is pre-fetched every 2 bytes, and the bus status and the DMUX are detected in view of F and D, respectively. In order to simulate the instruction code pre-fetching operation, therefore, the pre-fetched instruction code is written in the memory address indicated by a pseudo instruction queue write pointer (WP) while incrementing each content of the pointer WP by 2. In order to simulate that the instruction code is fetched from the instruction queue, on the other hand, the instruction queue is fetched from the memory address indicated by a pseudo instruction queue read pointer (RP), and the content of this pointer (RP) is incremented by 1, because that fetch can be detected from the queue status.

The value of the QDEPTH is sequentially calculated for the actual operation starting from the reset time of the processor by a hardware circuit 700 disposed in the instruction tracer, as shown in FIG. 7. The calculated result is contained in the information of one frame to be fetched in the buffer memory by the instruction tracer. In FIG. 7, reference numeral 701 designates a signal line for transmitting therethrough the queue status signal, and numeral 702 designates a decoder for decoding the queue status signal on the signal line 701. From the decoder 702, there are outputted two signals: the signal on a signal line 703 takes a high level when the queue status signal indicates the symbol F or S of Table 1; and the signal on a signal line 707 takes the high level when the queue status signal indicates the symbol E of Table 1. Letter 704 designates a modulo-6 up counter, which has its value incremented by 1 at each detection of a rising edge at which the signal on the line 703 transits from the low to high levels. Numeral 705 designates the output signal line of the counter 704, which has a length of 3 bits. Numeral 708 designates a signal line for transmitting therethrough the reset signal of one system including the processor and the instruction tracer, and the reset signal is actively high. Numeral 709 designates an AND gate made receptive of the signal on the line 707 and the reset signal on the line 708. Numeral 710 designates the output signal line of the AND gate 709. Numeral 711 designates a signal line for transmitting the bus status signal from the processor to a decoder 712. Numeral 713 designates the output signal line of the decoder 712, and the signal on the line 713 takes the high level when the bus status signal indicates the symbol F (i.e., code fetch) of Table 2. Numeral 714 designates a modulo-6 up counter which is made receptive of the signal on the line 713. The counter 714 has its value incremented by 2 each time it detects one rising edge of the signal on the line 713. Numeral 715 designates the output signal line of the counter 714, which has a length of 3 bits. Numeral 706 designates a subtracter. This subtracter 706 is made receptive of the respective output signals of the counters 704 and 714 through the signal lines 705 and 715, respectively, to subtract the value of the output signal of the counter 704 from the value of the output signal of the counter 714 and to output the resultant difference to a signal line 716.

The operations of the QDEPTH calculating hardware 700 of FIG. 7 will be briefly described in the following. The queue status signal and bus status signal of the processor are sequentially transmitted through the signal lines 701 and 711, respectively, to the inside of the QDEPTH calculating hardware 700. When the reset signal 708 of the system takes the high level, the output signal of the AND gate 709 also takes the high level and is inputted through the signal line 710 to the counters 704 and 714. These counters 704 and 714 have their outputs reset to zero when the signal on the line 710 takes the high level. When the processor starts its operation to pre-fetch the instruction code in response to a reset signal, the bus status represents the symbol F (i.e., code fetch) of Table 2 so that the counter 714 takes an output at 2. Since the processor latches the instruction code of 2 bytes in the instruction queue by a single pre-fetch operation, the decoder 713 increments the output of the counter 714 by 2 each time the bus status signal once detects the symbol F of Table 2. The fact that the processor fetches the instruction code of 1 byte from the instruction queue is grasped from the fact that the queue status signal on the signal line 701 detects the symbol F (First) or S (Subsequent) of Table 1, and the decoder 702 increments the output of the counter 704 by 1 each time the symbol F or S is detected. The result of subtracting at an instant by the subtracter 706 the value of the output of the counter 704 indicating the fetch of the instruction code from the instruction queue, from the value of the output of the counter 714 indicating the instruction code pre-fetch indicates the queue depth QDEPTH at that instant. When the symbol E (Queue Flush) of Table 1 is detected as a result that the queue status signal is decoded by the decoder 702, moreover, the signal on one output signal line 707 of the decoder 702 takes the high level. As a result, the signal on the output signal line 710 of the AND gate 709 takes the high level so that the counters 704 and 714 are reset. These resets of the counters 704 and 714 by the signal on the signal line 707 correspond to that the processor purges the content of the instruction queue.

Thus, the increment and decrement of the instruction code to be inputted to or outputted from the instruction queue are simulated by the hardware circuit 700 for QDEPTH calculation of FIG. 7. The simulated result is sequentially fetched as a part of the information of one frame, which is to latch the signals on the output signal line 716 altogether in the buffer memory of the instruction tracer, together with the informations of the data bus, address bus, queue status and bus status signals for a time period from the instant when the processor is reset to the instant when a series of operations are interrupted at the break point address.

Next, the method of inversely assembling the instructions, which are actually executed by the processor on the basis of the data in the trace buffer memory of FIG. 5 and accompanied by the I/O or memory access, to correspond to the I/O or memory access of the processor accompanying the execution of the instructions will be described in the following. In the precedence control, the time period from the latch to the execution of the instructions of the processor is not constant. However, the following description will be made with a prerequisite that the order of execution of the instructions is identical to that of fetch in the instruction queue, so long as the instructions do not contain one such as a branch instruction having a possibility of changing the sequence of the program.

When the instruction having been executed is to be traced, the status of an empty instruction queue is searched for and used as a reference for the trace. It is found from the queue status E when the instruction queue is emptied. In FIG. 5, for example, the QSTS represents E at frames 0002 and 0022. The instruction code fetched in the instruction queue by the instruction fetch immediately after the case of the queue status E is placed at the head of the instruction queue so that it is decoded and executed at first. When the instruction code has a variable byte length (e.g., an instruction of 1 to 6 bytes), it indicates the number of bytes of the instruction in which the numbers of one F from the F to a subsequent F of the queue status and S are summed. As shown in FIG. 5, after the QSTS represents E at the frame 0002, an address is outputted (as A in DMUX) at a frame 0003, and the data is fetched (as D in DMUX) at a frame 0004. Since the STS represents F, however, the data fetched at the frame 0004 is the instruction code and accordingly the instruction fetch immediately after the QSTS represents E at the frame 0002 and the instruction queue is empty. As a result, the instruction code fetched at the frame 0004 is at the head of the instruction queue at the frame 0004. Since the QSTS represents F at a frame 0006, it is found that the instruction code fetched at the frame 0004 has been fetched by the execution part. Since the QSTS represents S at frames 0007 and 0010 until the QSTS represents F at a frame 0011 after the frame 0006, it is found that the instruction having been fetched at the frame 0004 and begun to be executed from the frame 0006 has 3 bytes. Since, moreover, the address is issued at frame 0005 and since the instruction code is pre-fetched at a frame 0008, the instruction having begun to be executed from the frame 0006 has instruction codes BA, EA and FF (all in a hexadecimal notation), and provides mnemonics MOV, DX and FFEA if inversely assembled. Subsequently, the method of determining the byte number of the instruction code with reference to the empty status of the instruction queue at the frame 0002 to obtain the code of one instruction is repeated.

The instructions of the frame 0006 to 0010 are followed by those of frames 0011 to 0014. The queue status represents F at the frame 0011 but not S until it subsequently represents F at a frame 0015. As a result, the instructions having been executed at the frames 0011 to 0014 have 1 byte and a code EC (in hexadecimal notation) of 1 byte of the instruction codes of 2 bytes fetched at the frame 0008 other than the instruction codes of the frames 0006 to 0010. If the EC (in hexadecimal notation) is inversely assembled, there are obtained mnemonics IN, AL and DX. At the frames 0013 and 0014, the bus status STS represents I, which implies that the data indicated at the step of the frame 0014 has been fetched from the I/O port corresponding to the address outputted at the step of the frame 13. In other words, the I/O accesses established in the executing procedures of the instructions IN, AL and DX are those at the steps of the frames 0013 and 0014.

Thus, with reference to the frames at which the queue status signal represents the symbol E of Table 1, the code of one instruction is selected from the queue status signal, the bus status signal, the DMUX index, the data on the data bus, and the address on the address bus and is inversely assembled to obtain the instruction mnemonic, which is made to correspond to the memory or I/O access necessary for the instruction execution so that the instructions executed actually by the processor can be restored. If the trace buffer memory has one frame for the reference, the instructions on and after that frame can be restored sequentially one by one on the basis of the queue status signal, the bus status signal and the data on the data bus when in the instruction code pre-fetch. On the other hand, the instructions on and before the reference frame can be restored by tracing reversely of the time lapse from the reference frame with the use of the queue status signal, the bus status signal, the data on the data bus when in the instruction code pre-fetch, and the information of the queue depth QDEPTH.

The results of the instruction restoration (or trace) on the basis of the data in the trace buffer memory, as shown in FIG. 5, are presented in FIG. 8.

Next, the processor having the multi-stage pipeline structure will be described in the following (which processor will be temporarily called the "A processor").

FIG. 9 is a block diagram showing the internal structure of the A processor. Reference numeral 901 designates an A processor chip; numeral 902 an address bus signal line of the A processor, Numeral 903 a data bus signal line of the A processor; numeral 904 a data bus in the A processor; and numeral 905 an instruction pre-fetch composed of an instruction queue having the FIFO structure and an instruction queue control. Numeral 906 designates a signal line for transferring therethrough the head of the instruction queue in the instruction pre-fetch 905 to an instruction decoding unit 907, which in turn is composed of an instruction decoder and a sequencer for controlling the operation of the instruction decoding unit 907. Numeral 908 designates a decoded information queue having the FIFO structure for latching such one of the informations decoded by the instruction decoding unit 907 as for instructing the operation of an instruction execution unit 910. Numeral 909 designates a signal line for transmitting therethrough the information from the decoded information queue 908 to the instruction execution unit 910. This instruction execution unit 910 is constructed of a hardware composed of an arithmetic and logical unit and a variety of registers. Numeral 911 is an address generator for conducting address calculations in response to an information or command from the instruction decoding unit 907. Numeral 912 designates a signal line for transmitting therethrough the address generated by the address generator 911 to an address bus interface of a bus control 913. This bus control 913 controls the bus of the A processor and can be divided functionally and roughly into three parts: the address bus interface part; a data bus interface part; and a bus cycle control part. The address bus interface part has a function to output the address determined with respect to the system address bus of the system including the A processor from the address bus 902 of the A processor and is constructed of a hardware composed of a group of address registers 919 for latching a variety of addresses. The data bus interface part is constructed of a hardware composed of temporary registers 916 for fetching and temporarily latching data from the system data bus through the data bus 903 of the A processor, and a temporary register 917 for temporarily latching data generated in the A processor before the data is outputted to the system data bus. The bus cycle control part of the bus control 913 controls the bus cycle of the A processor, the bus status output and the input/output of the signal from the external terminal of the A processor. Numeral 915 designates a signal line for bidirectionally transmitting the information instructing the operation of the bus control 913 from the instruction decoding unit 907 and the information indicating the internal status of the bus control 913 to the instruction decoding unit 907, respectively. Numeral 914 is a signal line for both sending the information necessary for the address generation and the information for instructing the operation of the address generator 911 from the instruction decoding unit 907 to the address generator 911 and transmitting the information indicating the internal status of the address generator 911 from the address generator 911 to the instruction decoding unit 907. Numeral 918 designates a signal line for transferring the data generated in the instruction execution unit 910 to the temporary register 917 disposed in the data bus interface part of the bus control 913 and from the temporary registers 916 disposed in the data bus interface part of the bus control 913 to the instruction execution part 910. Numeral 920 designates a bus status signal line of the A processor, and numeral 921 designates a signal line for informations such as the memory read signal or the I/O write signal to be outputted to the outside of the A processor. Numeral 922 designates a queue status signal line of the A processor.

The A processor is constructed of the instruction pre-fetch 905, the instruction decoding unit 907, the address generator 911, the bus control 913, and the instruction execution unit 910. The instruction pre-fetch 905 has a hardware composed mainly of an instruction queue having the FIFO structure for latching a pre-fetched instruction code. The instruction decoding unit 907 has a hardware composed of a decoder for an instruction code of several bytes fetched from the instruction queue, a sequence for administering the operation of the instruction decoding unit, a program counter, and the decoded information queue 908 having the FIFO structure for latching the decoded information of an instruction. The address generator 911 has a hardware for an addressing. The bus control 913 is composed mainly of the address bus interface part, the data bus interface part, and the bus cycle control part. The address bus interface part is composed of a group of registers 919 such as a pre-fetching address register, a read operand address register and a write operand address register. The data bus interface part is composed of: the temporary registers 916 for temporarily latching the data obtained by the read access of the A processor to the outside; and the temporary register 917 for temporarily latching data for the write access of the A processor to the outside. The bus cycle control part is composed mainly of a sequencer. The instruction execution unit 910 is composed of an arithmetic and logical unit, a register file, a shifter and a control circuit for controlling the instruction executions.

The hardware of the A processor to be used for describing the present invention is determined as follows. The instruction queue of the instruction pre-fetch 905 has a length of 1 byte and a capacity of 8 bytes at the maximum. The instruction decoding unit 907 fetches an instruction code of 1 byte from the instruction queue in response to one clock. The decoded information queue 908 has a capacity for latching a decoded information of two instructions. Two temporary registers 916 of the bus control 913 are provided for one word of data and designated at RDR1 and RDR2, respectively. One temporary register 917 is provided for one word of data and is designated at WDR. Pre-fetching one of the address registers 919 is provided for one address information and is designated at PAR. Two read operand ones of the address registers 919 are provided for one address information and are designated at RAR1 and RAR2, respectively. The address register RAR1 corresponds to the temporary register RDR1, and the address register RAR2 corresponds to the temporary register RDR2. Write operand one of the address registers 919 is provided for one address information and is designated at WAR. This address register WAR corresponds to the temporary register WDR.

FIG. 10 is a block diagram showing the major components of the address bus interface part of the bus control 913 of the A processor. The signal line 912 is identical to that of FIG. 9 and transfers the address generated by the address generator 911. Reference numerals 1002, 1005, 1008 and 1011 designate a group of address registers, which are divided according to the kinds of addresses to be stored into a pre-fetching address register (PAR) 1002, a read operand address register 1 (PAR1) 1005, a read operand address register 2 (PAR2) 1008, and a write operand address register (WAR) 1011. Numerals 1003, 1006, 1009 and 1012 designate the respective latch signals of the registers 919 (i.e., 1002, 1005, 1008 and 1011). Numerals 1004, 1007, 1010 and 1013 designate the output signal lines of the registers 1002, 1005, 1008 and 1011, respectively. Numeral 1014 designates a multiplexor which made is receptive of the signals on the signal lines 1004, 1007, 1010 and 1013 for selecting only one of the four inputs without fail in response to a selection signal. The output of this multiplexor 1014 is fed to the address bus 902. The four latch signals 1003, 1006, 1009 and 1012 and the selection signal of the multiplexor 1014 are generated in the instruction decoding unit 907 and are transferred through a signal line 915. The register 1002 has an automatic address updating (or incrementing) function none of other three registers 1005, 1008 and 1011 have. If the address on the signal line 912 is once latched in the register 1002 in response to the latch signal 1003, the signal on the output signal line 1004 of the register 1002 is selected as the output of the multiplexor 1014 so that the register 1002 has its content incremented by a constant quantity each time the bus control 913 has its instruction code pre-fetching memory read bus cycle completed. Thanks to said automatic updating function of the register 1002, the instruction decoding unit 907 has its load lightened because the content of the register 1002 need not be updated in each bus cycle for the instruction code pre-fetch after it has once set the register 1002 with the instruction code pre-fetching address, until it subsequently has to set the register 1002 with a new instruction code pre-fetching address in response to a branch instruction.

Next, the operations of the A processor will be described in summary.

The instruction code latched in the memory is fetched in the A processor by the instruction code pre-fetching function of the A processor. This pre-fetching action is shared among the instruction decoding unit 907, the address generator 911, the bus control 913 and the instruction pre-fetching 905. In this pre-fetching action, when the pre-fetching address is written in the pre-fetching address register PAR of the bus control 913 from the bus generator 911 in response to the command from the instruction decoding unit 907, the updating of the address register PAR is conducted by the bus control 913 until the content of the register PAR is subsequently rewritten in response to the command of the instruction decoding unit 907. The bus control 913 performs the pre-fetching action if the system address bus and system data bus coupling the A processor and the system are empty. The bus control 913 outputs not only the content of the address register PAR to the system address bus but also the code or the instruction code fetch to a bus status signal BST2-0 to bring an MMIO signal accessible to the memory. The bus control 913 fetches therein the content (i.e., the instruction code) of the addres in the memory corresponding to the pre-fetching address outputted to the system address but and transfers it to the instruction queue of the instruction pre-fetch 903 to update the content of the register PAR. Then, the instruction pre-fetch 905 latches the instruction codes transferred from the bus control 913 sequentially in the tail of the instruction queue. This instruction pre-fetch 905 has a major function to control the action of the instruction queue and the output of a queue status QST3-0. The major function of the bus control 913 is the memory access, the I/O access and the control of the input/output of most of the control signals. The major function of the address generator 911 is address calculations for various addressings. The major function of the instruction decoding unit 907 is to decode the instruction code and to control the actions of the individual parts of the A processor. The major function of the instruction execution unit 910 is to process the data actually such as the arithmetic and logical calculations.

The statuses of the A processor will be described in the following. The A processor has two kinds of queues: the instruction queue of the instruction pre-fetch 905 and the decoded information queue of the instruction decoding unit 907. In order to exhibit the statuses of these two kinds of queues, the A processor outputs the queue status signal QST3-0 of 4 bits to the outside. The QST3-0 signal takes the high level for one clock period, when the decoded information of one instruction at the head of the decoded information queue is fetched to the instruction execution unit 910, and indicates that a new instruction begins to be executed by the instruction execution unit 910. A signal QST2-0 exhibits the statuses of the two kinds of queue of the A processor, as encoded in Table 4. The queue status signals are generated in the instruction decoding unit 907. The bus statuses are so encoded by a bus status signal BST2-0, the signal MMIO indicating the memory access or the I/O access, and a signal RDWR indicating the read access or the write access as is listed in Table 5. The MMIO signal represents the memory access when at the high level, the I/O access when at the low level, and no access when in the high impedance state. The RDWR signal represents the read access when at the high level, the write access when at the low level, and no access when in the high impedance state. The bus status signal BST2-0, the MMIO signal and RDWR signal are generated in the bus control 913.

The instruction decoding unit 907 fetches the instruction codes of one instruction by 1 byte sequentially from the instruction code at the head of the instruction queue and latches them in the instruction code register. The instruction decoder receives the output of the instruction code register and decodes the instruction code. As a result of the decoding at the instruction decoding unit 907, there are generated: an information for instructing the action of the instruction execution unit 910, an information necessary for the action of the instruction execution unit 910, an information for instructing the action of the address generator 911, an information necessary for the action of the address generator 911, an information for instructing the action of the bus control 913, and an information necessary for the action of the bus control 913. The information relating to the instruction execution unit 910 is latched in the decoded information queue 908. The informations relating to the address generator 911 and the bus control 913 are not especially latched in the instruction decoding unit 907. As a result, when the content of the instruction code register is updated, the informations relating to the address generator 911 and the bus control 913 will change. The informations sent from the instruction decoding unit 907 and relating to the address generator 911 and the bus control 913 are latched in the address generator 911 and the bus control 913, respectively. In case, however, the address generator 911 or the bus control 913 is disabled to receive the information sent from the instruction decoding unit 907 by its internal status, an information (i.e., a busy signal) indicating incapability of receiving the information given at present is resent to the instruction decoding unit 907. This instruction decoding unit 907 finishes its decoding action of the instruction code of one instruction by latching the information relating to the action of the instruction execution unit 910 in the decoded information queue 908. If the decoded information queue 908 is occupied and if the busy signal is received from the address generator 911 or the bus control 913, the instruction decoding unit 907 interrupts its decoding action. Even in this case, the instruction pre-fetch 905 is controlled.

The instruction decoding unit 907 not only monitors the clogging of the instruction queue of the instruction pre-fetch 905 at all times but also controls the pre-fetch demand of the instruction code. For example, in case the instruction queue is emptied, namely, in case an unconditional branch instruction is found as a result of decoding the instruction code of one instruction of several bytes fetched from the instruction queue at the instruction decoding unit 907, this unit 907 commands the instruction pre-fetch 905 to instantly purge all the content of the instruction queue; commands the address generator 911 to generate and transfer an address to be branched to the bus control 913; and commands the bus control 913 to rewrite the content of the pre-fetching address register PAR by a new pre-fetch address information transferred via the address generator 911 and to start the pre-fetching action from a new branched address. The pre-fetching action from the branched address immediately after the decoding of the branch instruction is given the highest preference order of all the events in the A processor, that need the use of the external bus. More specifically, the pre-fetching actions from the branched address immediately after the branched instruction decoding are sequentially continued until an instruction code of a predetermined number of bytes is latched in the instruction queue, and the external bus for the memory access necessary for the instruction execution cannot be used during the period of the pre-fetching action. In accordance with the commands from the instruction decoding unit 907 thus far described, the pre-fetching action of the instruction code by the A processor will proceed.

The sequences of the instruction coding unit 907 and the instruction execution unit 901 in response to a series of instructions are completely identical. Let the case be considered as a simple example, in which instructions (1) and (2) other than the branch ones are stored in the recited order in areas of a memory having continuing addresses. By the pre-fetching function of the A processor, the instructions codes each having several bytes are fetched in the order of the instructions (1) and (2) in the instruction queue of the instruction pre-fetch 905, and the decoding of the instruction (2) is deferred until the instruction decoding unit 907 finishes the decoding of the instruction (1) to store the necessary decoding information in the decoded information queue 908. As a result, the instruction execution unit 910 also fetches the decoded information of the instruction (2) at the head of the decoded information queue 908 to execute the instruction (2) after it has finished the execution of the instruction (1) by using the decoded information of the instruction (1) fetched from the decoded information queue 908.

In case the instruction decoded in the instruction decoding unit 907 is one latched in the memory or requiring the read operand for the I/O, the read operand is read in precedence. The read operand is read in advance prior to the time at which the instruction requiring the read operand is executed in the instruction execution unit 910, but this preceding read cannot always be conducted previously depending upon the statuses and conditions of the inside and outside of the A processor. The advanced read of the read operand will be described in the following. When the instruction code of the instruction requiring the read operand is latched in the instruction code register of the instruction decoding unit 907 and is inputted to and decoded by the decoder, the advanced reading action of the read operand is designated as the information relating to the actions of the address generator 911 and the bus control 913 by the instructions decoding unit 907. In the actions for the advanced read of the read operand assigned to the address generator 911 by the instruction decoding unit 907, the information necessary for the address generation of the read operand is issued from the instruction decoding unit 907 to the address generator 911 to the advanced reading address of the read operand, and this advanced reading address generated is transferred to the bus control 913. In the actions for the advanced read of the read operand assigned to the bus control 913 by the instruction decoding unit 907, the advanced reading address of the read operand transferred via the address generator 911 to the bus control 913 is latched in one of the two read operand address register PAR1 and PAR2 in the address bus interface part of the bus control 913 by designating that particular one, and the read bus cycle is started to read and latch the read operand in the read operand data register corresponding to that read operand address register. In the actions for the advanced read of the read operand assigned to the bus control 913 by the instruction decoding unit 907, no timing is designated. The bus control 913 starts, when it receives the information for the aforementioned advanced read of the read operand from the instruction decoding unit 907, the read bus cycle for the advanced read of the read operand in accordance with the statuses and conditions of the outside system data bus, the system data bus and the system address bus of the A processor to latch the read operand in the read temporary register designated. The starting timing of the read bus cycle for the read operand advance road is not controlled by the instruction execution unit 910 and the instruction decoding unit 907, but the bus control 913 is controlled independently of the remaining units.

The advanced read of the read operand is detected at the decoding stage of the instruction decoding unit 907 of the instruction code requiring the read operand. The instruction decoding unit 907 assigns the aforementioned actions to the address generator 911 and the bus control 913 and allocates the read operand register RDR1 or RDR2 to be read-accessed by the instruction execution unit 910, as an information for designating the action of the instruction execution unit 910 in the decoded information queue 908 after the bus control 913 has read the read operand. For example, in case the instruction decoded in the instruction decoding unit 907 is one requiring two read operands in the memory, the bus control 913 is instructed to latch the address of the first operand in the register RAR2 and accordingly the data of the first operand in the register RDR2 and the address of the second operand in the register RAR1 and accordingly the data of the second operand in the register RDR1. In this case, the information is so latched in the decoded information queue 908 to finish the decoding of said instruction that the instruction execution unit 910 may execute the instruction by using the content of the register RDR2 for the first operand data and the content of the register RDR1 for the second operand data. In case both the two read operands in the memory have been transferred in advance from the memory to the registers RDR1 and RDR2 when the decoded information of said instruction is to be fetched from the head of the decoded information queue 908 and executed by the instruction execution unit 910, this unit 910 can obtain the data of the two operands existing intrinsically in the memory merely by making accesses to the registers in the A processor. Although this memory access requires several clocks, the instruction execution unit 910 appears to have accessed to one read operand with one clock, in case the data of the read operands in the memory could be transferred in advance to the registers RDR1 and RDR2 (in this case) in the bus control 913 in the A processor prior to the instant of requirement of the instruction execution unit 910, so that the instruction execution efficiency and still the better the throughput of the A processor can be improved.

In case, however, the external system data bus and system address bus of the A processor are occupied for a long time by another bus master, the start of the read bus cycle for the advanced read of the read operand is deferred at the earliest until the occupation of the system bus is returned from the bus master effective at present to the A processor even if the bus control 913 receives the information concerning the advanced read of the read operand furnished from the instruction decoding unit 907 during the decoding period of the instruction code of the instruction requiring the read operand at the instruction decoding unit 907. Even if the advanced read of the read operand is thus deferred, the instruction execution unit 910 executes the instruction requiring actually the read operand, no matter whether the read operand might have been read in advance or not, to read out the content of the read operand register of the bus control 913 designated by the instruction decoding unit 907. When the read operand is not read in advance in the read operand register designated by the instruction decoding unit 907, the instruction execution unit 910 interrupts its action and waits until the bus control 913 starts the read bus cycle to read the data from the read operand and latch it in the read operand register designated by the instruction decoding unit 907 so that the instruction execution unit 910 is allowed to access to said read operand register. When the action of the instruction execution unit 910 is interrupted, the decoded information queue 908 is also halted so that the decoding action at the instruction decoding unit 907 is interrupted, thus halting all the major operations of the A processor. When the bus control 913 starts the read bus cycle to latch the read operand in the read temporary register designated by the instruction decoding unit 907, the action of the instruction execution unit 910 is reopened together with the decoding action of the instruction decoding unit 907, thus reopening the operations of the A processor. In this example, simultaneously as the instruction requiring the read operand in the memory or I/O is decoded in the instruction decoding unit 907, the advanced reading action of the read operand is assigned from the instruction decoding unit 907 to the address generator 911 and the bus control 913 to latch the decoded information of said instruction in the decoded information queue 908. After this, the advanced read of the read operand is not performed until the instruction processing at the instruction execution unit 910 proceeds to execute said instruction from the head of the decoded information queue 908. In this case, the execution efficiency obtainable is similar to that of the aforementioned processor.

The order of a series of instructions to be decoded in the instruction decoding unit 907 and the order of read operands to be read in advance in the bus control 913 are completely identical. For example, let the case be considered in which two instructions (3) and (4) both requiring read operands in a memory are latched in the recited order in an instruction queue. The instruction decoding unit 907 first fetches the instruction code (3) of several bytes of the instruction (3) from the instruction queue to decode it, and assigns a memory read access for the advanced read of the read operand (3) of the instruction to the bus control 913 to latch the decoded information concerning to the instruction (3) in the decoded information queue 908. Next, the instruction decoding unit 907 fetches the instruction code (4) of several bytes of the instruction (4) to decode it, and assigns the memory read access for the advanced read of the read operand (4) of the instruction (4) to the bus control 913. As a result, the bus control 913 receives the memory read access designation for the advanced read of the read operand (3) and then the memory read access designation for the advanced read of the read operand (4) of the instruction (4) from the instruction decoding unit 907 to read the read operands in advance in the order of their receptions so that the orders of the flow of the series instructions and the advanced read of the read operands at the bus control 913 are identical.

In case the instruction decoded in the instruction decoding unit 907 requires a write operand in the memory or I/O, the write operand is post-written. This post-write of the write operand will be briefly described because the write operand is equivalent to the read operand. When the instruction code of an instruction requiring the write operand is latched in the instruction code register of the instruction decoding unit 907 so that it is inputted to and decoded by the decoder, the post-write of the write operand is designated as the information relating to the actions of the address generator 911 and the bus control 913 by the instruction decoding unit 907. In the actions of post-writing the write operand assigned to the address generator 911 by the instruction decoding unit 907, the address generator 911 is furnished from the instruction decoding unit 907 with the information necessary for generating the address of the write operand, and this address thus generated for post-writing the write operand is transferred to the bus control 913. In the actions for post-writing the write operand assigned to the bus control 913 by the instruction decoding unit 907, the write operand post-writing address transferred via the address generator 911 to the bus control 913 is latched in the write operand address register WAR in the address bus interface part of the bus control 913, and the instruction requiring the write operand is executed in the instruction execution unit 907. After having latched the execution result of said instruction in the write temporary register WDR 917, the instruction execution unit 907 starts the write bus cycle to write the content of the register WDR out to the address latched in the address register WAR. In the actions for post-writing the write operand assigned to the bus control 913 by the instruction decoding unit 907, the timing for starting the write bus cycle is not designated. In the bus control 913, the information for post-writing the write operand is obtained from the instruction decoding unit 907, and the instruction execution result from the instruction execution unit 910 is latched in the temporary register WDR. After this, the write operand is written out when the memory access or the I/O access is possible, depending upon the statuses and conditions of the external system data bus and system address bus of the A processor. The timing for starting the write bus cycle for post-writing the write operand is controlled not by the instruction unit 910 but by the bus control 913 independently of the remaining units.

Moreover, similarly as the order of reading the read operands in advance is identical to the flow of the series instructions, the order of post-writing the write operands is identical to the flow of the series instruction.

In the A processor adopting the high-grade pipeline structure, as has been described hereinbefore, the advanced read of the read operands and the post-write of the write operands are carried out by the read temporary registers, write temporary register and control hardware of the bus control 913, and the instruction execution unit 910 and the bus control 913 having different instruction processing rates smoothly process together the instructions and improve the instruction processing efficiency. As has been described hereinbefore, moreover, the flow of the series instructions and the processing order of the instructions at the instruction execution unit 910 are identical, and the order of the advanced read of the read operands and the order of the post-write of the write operands are also identical to the flow of the series instructions. However, the bus control 913 for the memory access and I/O access for the advanced read of the read operands and for the post-write of the write operands is restricted by the internal and external statuses of the A processor so that the timing for the memory access or I/O access of the bus control 913 is not controlled by, but independent from, the instruction decoding unit 907 or the instruction execution unit 910 in the A processor. As a result, it is apparent that the read bus cycle for the advanced read of the read operands is conducted during a time period after the instruction code of the instruction requiring the read operand has been decoded in the instruction decoding unit 907 and before the execution of said instruction is finished, and that the write bus cycle for the post-write of the write operands is conducted after the execution of the instruction requiring the write operand has been finished. It is, however, impossible to predict when the bus cycle for reading a certain read operand in advance or writing a certain write operand later is started.

For the following description, two instructions of the assembly language of the A processor will be defined in connection with their mnemorics and operations.

Letters MOV d,s designate a transfer instruction, in which the letter d designates a destination operand whereas letter s designates a source operand so that the content of the operand designated at s is transferred to the operand designated at d. The destination operand d and the source operand s may be either register resources in the A processor or in the memory or I/O port. On the other hand, the destination operand d and the source operand s can be addressed either directly or indirectly by using a register. As a result, if an address in the memory is assigned as the source operand s, the transfer instruction MOV d,s is one requiring the read operand in the memory. If, on the other hand, an address in the memory is assigned as the destination operand d, the instruction MOV d,s is one requiring the write operand in memory.

Letters JUMP adr designate an unconditional branch instruction, in which the letters adr designate the branched address of said branch instruction. If the instruction code of the branch instruction JUMP adr is decoded by the instruction decoding unit 907 in the A processor, all the contents of the instruction queue of the instruction pre-fetch 905 are deleted in response to the command of the instruction decoding unit 907, and the value corresponding to the address adr is latched in the pre-fetching address register PAR of the bus control 913 so that this control 913 pre-fetch a new instruction code from the memory address indicated by the content of the register PAR.

FIG. 11 presents a portion of the program which is written by using the transfer instruction MOV d,s and the unconditional branch instruction JUMP adr. Letters L1, L2, . . . , and L10 designate line numbers, and operands M10, M11, M21, . . . , M100, and M101 are all in the memory. On the other hand, operands R2, R3, R6 and R7 are assigned to the registers in the instruction execution unit 910. The operands M10, M11, . . . , M100, and M101 may be addressed directly or indirectly.

Table 3 lists correspondences between the instruction mnemonics and codes used in FIG. 11.

TABLE 3

| Instruction | Mnemonics | Instruction | Codes |
|---|---|---|---|
| MOV | M10, M11 | OPCD10 | OPCD11 |
| MOV | R2, M21 | OPCD20 | OPCD21 |
| MOV | R3, M31 | OPCD30 | OPCD31 |
| JUMP | ADR60 | OPCD40 | OPCD41 |
| MOV | M50, M51 | OPCD50 | OPCD51 |
| MOV | R6, M61 | OPCD60 | OPCD61 |
| MOV | M70, R7 | OPCD70 | OPCD71 |

In Table 3, for example, the instructions of the mnemonics MOV M10 and M11 have instruction codes OPCD10 and OPCD11. Here, these instruction codes OPCD10 and OPCD11 have binary patterns having a length of 1 byte. The transfer instructions MOV d,s and the unconditional branch instruction JUMP adr are assumed to have instruction codes of 2 bytes.

FIG. 12 is a diagram showing the location in the memory when the object codes obtained by assembling the program of FIG. 11 are stored in the memory. Letters ADR10, ADDR11, . . . , ADR100, and ADR101 appearing in FIG. 12 designate the addresses of the memory. This memory has a length of 1 byte. For example, it is found that the instruction code OPCD10 is latched in an area having the address ADR10 of the memory. The addresses ADR10 to ADR51 and the addresses ADR60 and later are continuous, but the addresses ADR51 and ADR60 are not always continuous.

FIG. 13 is a time chart showing the summary of the operation timings of the individual units inside of the A processor. The detail of the timing relationships among the gate delay, addresses and data are omitted from FIG. 13. There are presented in FIG. 13: time instant t1 to t17 at which actions are conducted at individual parts inside of the A processor; the order of decoding the instructions in the instruction decoding unit 907 and the outputs of the queue status 922, as indicated by the abbreviated symbols of Table 4; the changes in the contents of the two read operand address registers RAR1 and RAR2 and the write operand address register WAR in the address interface part of the bus control 913; and informations on the system address bus and system data bus outside of the A processor; and the changes in the contents of the two read operand data registers RDR1 and RDR2 and the write operand data register WDR of the data bus interface part inside of the A processor. As to the queue statuses, however, only the symbols F and E1 of Table 4 are presented whereas the other symbols are omitted.

TABLE 4

| QST | Status of Instruction Queue | |
|---|---|---|
| 2 1 0 | Status of Decoded Information Queue | Symbol |
| 0 0 0 | No Fluctuation of Instruction Queue and Decoded Information Queue Head of Instruction Queue Located at 1st Byte of Instruction Code | N |
| 0 0 1 | No Fluctuation of Decoded Information Head of Instruction Queue Located at 2nd and after Instruction Code | F |
| 0 1 0 | No Fluctuation of Decoded Information Content of Instruction Queue Cleared | S |
| 0 1 1 | No Fluctuation of Decoded Information Content of Instruction Queue Cleared | E1 |
| 1 0 0 | Content of Decoded Information Queue Cleared | E2 |

In the columns of the instruction decoding unit 907 and the instruction execution unit 910 I1, I2, I3, JUMP, I6 and I7 are symbols for discriminating the instructions presented in FIG. 11. For example, the symbol I1 represents a transfer instruction of the mnemonics MOV M10 and M11.

In the instruction decoding unit 907, at the time t1, (which will be likewise abbreviated to t1, t2, . . . , and so on), the instruction code of 2 bytes of the instruction I1 (which will be likewise abbreviated to I1, I2, . . . , and so on) is fetched sequentially from the head of the instruction queue and is decoded. Since the instruction I1 requires the read operand M11 in the memory, the instruction decoding unit 907 commands the address generator 911 to generate and transfer the address RA1 of the read operand M11 to the bus control 913, and commands the bus control 913 to latch the address RA1 transferred from the address generator 911 in the read operand address register RAR1 of the address bus interface part and to read in advance the data stored in the area of the address RA1 in the memory and to latch it in the read operand data register RDR1 of the data bus interface part. Since, on the other hand, the instruction I1 requires the write operand M10 in the memory, the instruction decoding unit 907 commands the address generator 911 to generate and transfer an address WA1 of the write operand M10 to the bus control 913, and commands the bus control 913 to latch the address transferred from the address generator 911 in the write operand address register WAR of the address bus interface part and to latch the data, which is transferred to and latched in the write operand data register WDR of the data bus interface part of the bus control 913 during the execution of the instruction I1 by the instruction execution unit 910, in the area of the address WA1 in the memory after the execution of the instruction I1 by the instruction execution unit 910. The decoding of the instruction I1 is finished by latching the information necessary for the processing of the instruction I1 at the instruction execution unit 910 in the tail of the decoded information queue 908. From and after the time t2, an instruction code of 2 bytes of the instruction I2 is fetched from the head of the instruction queue and is decoded. Since the instruction I2 requires the read operand M21 in the memory, like the instruction I1, the address RA2 of the read operand M21 is generated in the address generator 911 and latched in the address register RAR2 of the bus control 913, and it is commanded that the data be read in advance from the area of the address RA2 in the memory. The decoding of the instruction I2 terminates at the time t6. On and after the time t6, the instruction I3 is decoded. On and after the time t6, more specifically, the instruction code of 2 bytes of the instruction I3 is fetched from the head of the instruction queue to start its decoding. Since the instruction also requires the read operand M31 in the memory, Like the instructions I1 and I2, the address RA3 of the read operand M31 is generated in the address generator 911 and is latched in that one of the two read operand address registers in the bus control 913, which has already been subjected to the advanced read of the read operand so that its content has become unnecessary. In the case of this example, the address RA3 is latched in the address register RAR1. As will be described hereinafter, at the time t3, the bus control 913 uses the read operand address RA1 of the instruction I1, which has been latched in the register RAR1 at t1, to start the memory read bus cycle for the advanced read of the read operand of the instruction I1 and to latch the data RD1 of the address RA1 of the memory in the register RDR1. At t6, therefore, the content RA1 of the register RAR1 has already been unnecessary. Likewise, at t5, the content RA2 of the register RAR2 has been used to start the memory read bus cycle for the advanced read of the read operand of the instruction I2 so that the data RD2 of the address RA2 in the memory has been latched in the register RDR2. As a result, at t6, the content RA2 of the register RAR2 has already become unnecessary, and the register RAR2 itself has become substantially empty. At t9, the decoding of the instruction I3 is finished. On and after t9, the decoding of the instruction JUMP is started. On and after t9, more specifically, the instruction code of the instruction JUMP of 2 bytes is fetched sequentially from the head of the instruction queue and is decoded. This instruction JUMP is an unconditional branch instruction so that it makes all the contents of the instruction queue ineffective when its instruction code is decoded at the instruction decoding unit 907. Since the instruction code of the instruction JUMP has a branched address, the instruction decoding unit 907 decodes said branched address and commands the address generator 911 to transfer the information obtained by decoding said branched address thereby to generate and transfer said branched address to the bus control 913. The instruction decoding unit 907 further commands the bus control 913 to latch said branched address transferred from the address generator 911 in the pre-fetch address register PAR and then to conduct the pre-fetch of the instruction code from the content of the register PAR in precedence to the advanced read of the read operand and the post-write of the write operand. No execution of the instruction JUMP is at the instruction execution unit 910, but the information of "NO Execution" is latched as the decoded information of the instruction JUMP in the tail of the decoded information queue 908, thus finishing the decoding of the unconditional branch instruction JUMP at t12. From t12 to t13, the instruction decoding unit 907 interrupts its action and is held in a waiting status until the instruction code of one or more instructions is stored in the instruction queue emptied on the decoding of the instruction JUMP by the prefetch of a new instruction code of the instruction JUMP from the branch. On and after t13, the instruction I6 is decoded. The instruction code of the instruction I6 of 2 bytes is fetched from the head of the instruction queue and decoded, and the address RA6 for the read operand M61 of memory necessary for the instruction I6 is generated in the address generator 911 and latched in the register RAR2 of the bus control 913. Then, the advanced read of the read operand in the memory for the instruction I6 is commanded by the use of the content RA6 of the register RAR1. At t15, the decoding of the instruction I6 is finished by latching the information necessary for the execution of the instruction I6 by the instruction execution unit 910 in the tail of the decoded information queue 908. On the after t15, the decoding of the instruction I7 is started. This decoding of the instruction I7 is conducted by fetching the instruction code of the instruction I7 of 2 bytes from the head of the instruction queue. Since this instruction I7 requires the write operand M70 in the memory, the instruction decoding unit 907 commands the address generator 911 to generate and transfer an address WA7 for the write operand M70 to the bus control 913. This bus control 913 is also commanded to latch the address WA7 transferred from the address generator 911 in the write operand address register WAR and, after the processing of the instruction I7 at the instruction execution unit 910, to write the data transferred to and latched in the register WDR in the memory by the use of the address WA7 of the content of the address register WAR. Thus, in the instruction decoding unit 907, the decodings of the instructions I1, I2, I3, JUMP, I6 and I7 are started from t1, t2, t6, t9, t13 and t15, respectively. The queue status 922 outputs a 3-bit code represented by the symbol F of Table 4 to the outside of the A processor, when the first 1 byte of the instruction code of one instruction is fetched from the instruction queue to the instruction decoding unit 907, so that it represents the symbol F immediately after t1, t2, t6, t9, t13 and t15. If, on the other hand, the decoding of the unconditional branch instruction JUMP is started from t9 at the instruction decoding unit 907, all the contents of the instruction queue are made ineffective at t10 so that the 3-bit code corresponding to the symbol E1 of Table 4 is outputted as the queue status at t10 to the outside of the A processor.

At t4, the instruction executing unit 910 fetches the decoded information of the instruction I1, which has headed the decoded information queue 908 at t4, to execute the instruction I1. This instruction I1 is one for transferring the read operand M11 in the memory to the write operand M10 in the memory. The A processor has the advanced reading function of the read operands. In the example of FIG. 13, the memory read bus cycle for reading the read operand M11 of the A processor is started at t3 prior to the time t4 at which the execution of the instruction I1 is started at the instruction execution unit 910, and the data RD1 corresponding to the read operand M11 obtained for the period of said memory read bus cycle is latched in the register RDR1. As a result, the read operand M11 of the instruction I1 has already existed in the A processor when the execution of the instruction I1 is started at t4. Therefore, the execution of the instruction I1 need not access to the outside of the A processor for establishing the read operand M11, and this operand M11 can be obtained if the register RDR1 in the A processor is accessed to, to shorten the time period for executing the instruction I1. On the other hand, this instruction I1 requires the write operand M10 in the memory. Since, however, the A processor has the write operand post-writing function, the data WD1 of the instruction I1 corresponding to the write operand M10 outside of the A processor has been latched in the data register WDR of the A processor when the execution of the instruction I1 at the instruction execution unit 910 is finished at t7 in the example of FIG. 13. The write of the write operand M10 of the instruction I1 in the memory is performed as a result that the memory write bus cycle for writing out the write operand M10 of the instruction I1 at the outside of the A processor is started at t8 after t8 at which the execution of the instruction I1 is finished at the instruction execution unit 910, and that the data WD1 of the instruction I1 corresponding to the write operand M10, which is latched in the data register WDR of the A processor at t8, is latched in a predetermined area of the memory. As a result, the period for executing the instruction I1 at the instruction execution unit 910 does not contain the bus cycle period for reading out the read operand in the memory and writing out the write operand in the memory, but the registers RDR1 and WDR in the A processor may be accessed to if either the read operand or the write operand is required, so that the time period for executing the instruction I1 can be drastically shortened.

The execution of the instruction I2 at the instruction execution unit 910 is started from t7 and finished at t11. The read operand M21 in the memory, which is required by the instruction I2, is read at t5 prior to the time t7, at which the execution of the instruction I2 is started at the instruction execution unit 910, and is latched in the register RDR2 in the A processor. At t10 for the period of executing the instruction I2 at the instruction execution unit 910, there arises a situation, in which the instruction decoded by the instruction decoding unit 907 is the unconditional branch instruction JUMP so that all the contents of the instruction queue are made ineffective to start a new instruction code pre-fetching action from the branch designated in the instruction code of the instruction JUMP. That situation, however, exerts no influence upon the execution of the instruction I2 at the instruction execution unit 910.

The execution of the instruction I3 at the instruction execution unit 910 is started at t11 and is finished at t17. Since the pre-fetching action from a new instruction code from a branch, which is started at t10 and caused by the decoding of the instruction JUMP, is allowed to continue to t13 by the highest precedence for occupying the external bus, the advanced read of the read operand M31 in the memory required by the instruction I3 cannot be conducted before the time t11 at which the execution of the instruction I3 is started at the instruction execution unit 910. Therefore, the execution of the instruction I3 at the instruction execution unit 910 is deferred, until the read operand advanced read of the instruction I3 acquires the bus occupation at t14 to start the memory read bus cycle for reading the read operand M31 to latch a data RD3 corresponding to the operand M31 from the memory in the register RDR1 in the A processor so that the instruction execution unit 910 can access to the register RDR1. After this, the data RD3 of the instruction I3 corresponding to the read operand M31 is fetched from the register RDR1 to the instruction execution unit 910 to execute the instruction I3, thus finishing the execution of the instruction I3 at t17.

The execution of the instruction JUMP at the instruction execution unit 910 is started at t17. This execution of the instruction JUMP requires no substantial action. The memory read bus cycle for reading the read operand M61 of the memory in advance, which is required by the instruction I6 at t16, is started so that the data RA6 corresponding to the read operand M61 is lathed in the register RDR2 of the A processor.

When the instruction decoding is conducted at the instruction decoding unit 907 in the order of the instructions I1, I2, I3, . . . , and so on, the instruction execution is also conducted at the instruction execution unit 910 in the order of the instructions I1, I2, I3, . . . , and so on. For example, however, the time period from the time t1, at which the decoding of the instruction I1 is started at the instruction decoding unit 907, to the time t4, at which the execution of the instruction I1 is started at the instruction execution unit 190, is determined depending upon the several internal and external conditions of the A processor and is generally difficult to predict. If, on the other hand, the instructions requiring the operand outside of the A processor such as a memory are decoded in the order of I1, I2 and I3 at the instruction decoding unit 907, the bus control 913 accesses to the outside of the A processor in the order of the accesses to the operands of the instructions I1, I2, and I3. For example, all the instructions I1, I2 and I3 require the read operands RA1, RA2 and RA3 in the memory, and the memory read bus cycle is started at the bus control 913 in the order of the read operands RA1, RA2 and RA3. As it will be understood from the foregoing description that the memory read bus cycle for the read operand of the instruction I3 is started at t14 after the time t11 at which the execution of the instruction I3 is started at the instruction execution unit 910, the time, at which the bus cycle for the access of the read operand of the instruction requiring the read operand outside of the A processor intervenes between the time of starting the decoding of said instruction at the instruction decoding unit 907 and the time of finishing the execution of said instruction, but is influenced by the several internal and external conditions of the A processor so that it is generally difficult to predict. This difficulty likewise applies to the case of the instruction requiring the write operand outside of the A processor. Specifically, the time, at which the bus cycle for the access of the write operand of said instruction is started, i.e., the time t8, at which the bus cycle for the access of the write operand M10 of the instruction I1 is started, comes after the time of finishing the execution of said instruction at the instruction execution unit 910, but is influenced by the several internal and external conditions of the A processor so that it is also generally difficult to predict.

The A processor implementing the high-grade pipeline structure has been described hereinbefore in connection with the summary of the hardware of the A processor and the summary of the actions of the individual units inside of the A processor, especially, the advanced instruction reading function of the A processor, the advanced reading function of the read operands, and the post-writing function of the write operands.

Next, let it be considered to develop a software by the use of the A processor. When a software was to be developed by the use of the aforementioned processor, the software being developed was debugged by the instruction tracing method. The software to be developed by the A processor is also debugged like the aforementioned processor by using the instruction tracing method and the instruction tracer to improve its developing efficiency. The instruction tracing method of the A processor is similar to the aforementioned processor instruction tracing method. The instruction tracer for the A processor is required to have a trace buffer memory break point setting function to sequentially store the individual frames, which are formed by sampling the information on the address bus 902, the information on the data bus 903, the necessary control signal and the status signal while the A processor is executing a series of instructions, as time-series data, and to a function to edit the information in the trace buffer memory. The break point is set by the use of the instruction tracer for the A processor so that the A processor is caused to fetch each frame when a new information is outputted to the address bus 902 or when the status signal changes, for example. After the A processor have its operations interrupted at the break point, it edits the content of the trace buffer memory to establish the mnemonic of the instructions in the order of its actual execution. For the memory and the instructions having been subjected to the I/O access, on the other hand, the A processor has to present the user the actually accessed addresses and data in a manner to correspond to the instruction mnemonics.

Assuming that the program shown in FIG. 11 is assembled and stored in the memory, as shown in FIG. 12, the description to be made is directed to the case in which the instruction tracing is to be conducted by the use of the instruction tracer for the A processor when the A processor executes a series of instructions in the vicinity of the memory address ADR10 appearing in FIG. 12. Table 5 presents a dump list of a portion of the content of the trace buffer memory of the instruction tracer for the A processor.

TABLE 5

| FRAME | ADDRESS | DATA | BUSSTS | QSTS4 | QSTS3-0 | FIG. 3 |
|---|---|---|---|---|---|---|
| 001 | | | | | F | t2 |
| 002 | | | | | S | |
| 003 | RA1 | | MR | | | t3 |
| 004 | | RD1 | MR | | | |
| 005 | | | | H | | t4 |
| 006 | ADR41 | | F | | | |

TABLE 5-continued

| FRAME | ADDRESS | DATA | BUSSTS | QSTS4 | QSTS3-0 | FIG. 3 |
|---|---|---|---|---|---|---|
| 007 |  | OPCD41 | F |  |  |  |
| 008 | ADR50 |  | F |  |  |  |
| 009 |  | OPCD50 | F |  |  |  |
| 010 | RA2 |  | MR |  |  | t5 |
| 011 |  | RD2 | MR |  |  |  |
| 012 |  |  |  |  | F | t6 |
| 013 |  |  |  |  | S |  |
| 014 |  |  |  | H |  | t7 |
| 015 | ADR51 |  | F |  |  |  |
| 016 |  | OPCD51 | F |  |  |  |
| 017 | WA1 |  | MW |  |  | t8 |
| 018 |  | WD1 | MW |  |  |  |
| 019 |  |  |  |  | F | t9 |
| 020 |  |  |  |  | S |  |
| 021 |  |  |  |  | E1 | t10 |
| 022 |  |  |  | H |  | t11 |
| 023 | ADR60 |  | F |  |  |  |
| 024 |  | OPCD60 | F |  |  |  |
| 025 | ADR61 |  | F |  |  |  |
| 026 |  | OPCD61 | F |  |  |  |
| 027 | ADR70 |  | F |  |  |  |
| 028 |  | OPCD70 | F |  |  |  |
| 029 | ADR71 |  | F |  |  |  |
| 030 |  | OPCD71 | F |  |  |  |
| 031 |  |  |  |  | F | t13 |
| 032 |  |  |  |  | S |  |
| 033 | RA3 |  | MR |  |  | t14 |
| 034 |  | RD3 | MR |  |  |  |
| 035 |  |  |  |  | F | t15 |
| 036 |  |  |  |  | S |  |
| 037 | RA6 |  | MR |  |  | t16 |
| 038 |  |  |  | H |  | t17 |
| 039 |  | RD6 | MR |  |  |  |

TABLE 6

| MMIO | RDWR | BST2 | BST1 | BST0 |  | Symbol |
|---|---|---|---|---|---|---|
| 0 | 0 | 0 | 0 | 0 | I/O Write Access | IOW |
| 0 | 1 | 0 | 0 | 0 | I/O Read Access | IOR |
| 1 | 0 | 0 | 0 | 0 | Memory Write Access | MW |
| 1 | 1 | 0 | 0 | 0 | Memory Read Access | MR |
| 1 | 1 | 0 | 0 | 1 | Inst. Code Fetch | F |
| 0 | 0 | 0 | 1 | 0 | Hold Acknowledge | HLTA |
| 0 | 0 | 0 | 1 | 1 | Interrupt Acknowledge | INTA |
| 0 | 2 | 1 | 1 | 1 | Idle State | IDL |

In Table 5, addresses RA1, ADR41, . . . , and so on appearing in the ADDRESS column are those outputted onto the address bus 902 by the A processor, and data RD1, OPCD41, . . . , and so on of the DATA column are those appearing on the data bus 903 for the input/output of the A processor. The BUS-STS column represents the bus status code, MMIO signal, RD and WR signals, which are outputted to the bus status terminal by the A processor, simply in the symbols F, MR and MW, as presented in Table 6. Letters 11 and L appearing in the QSTS4 column represent whether the signals outputted to the QSTS4 terminal by the A processor was at the high (H) or low (L) level. The QSTS3-0 column represents the queue status signals, which are outputted to the queue status terminal by the A processor, simply in the symbols F, S and E1, as presented in Table 4. The righthand end column is provided to present not the content of the trace buffer memory but the correspondence between FIG. 13 and Table 5, in which the symbol t2 corresponds to the time t2 of FIG. 13. First of all, the method of establishing the instruction mnemonics in the order of the actual execution of the instructions by the A processor will be briefly described with reference to the dump list of the content of the trace buffer memory, as listed in Table 5.

Like the processor instruction tracing method, the queue status selects as the present instruction tracing reference the instant indicating that all the contents of the instruction queue are purged. Since the QSTS3-0 column presents E1 (i.e., the purge of the content of the instruction queue) in the frame 021, as seen from Table 5, the frame is selected as the instruction tracing reference from the trace buffer memory of Table 5. It is at the frame 031 that the QSTS3-0 column first represents F after it exhibited E1 at the frame 021, and it is at the frame 035 that the QSTS3-0 column represents F subsequent to the frame 031. Since it is only at the frame 032 that the QSTS3-0 column represents S between the frames 031 and 035, the instruction having the first byte of its instruction code fetched from the instruction queue and transferred to the instruction decoding unit 907 at the frame 031 is one having an instruction code of a 2-byte length. The instruction having the first byte of its instruction code fetched from the instruction queue at the frame 031 is denoted at I. Next, the instruction code of this instruction I is selected. After all the contents of the instruction queue have been purged at the frame 021, the first instruction code fetch takes place at the frames 023 and 024. The instruction code outputted from an area in the memory corresponding to the prefetching address outputted at the frame 023 is OPCD60 of the DATA column at the frame 024. From the frames 023 and 024, it is found that the instruction code of the first byte of the instruction I is OPCD60. The instruction code fetch subsequent to the frames 023 and 024 is conducted at the frames 025 and 026, and the instruction code OPCD61 is fetched in the A processor. As a result, the instruction code having the length of 2 bytes of the instruction I is OPCD60 and OPCD61. Since the mnemonics MOV M60 and M61 are obtained by inversely assembling the instruction codes OPCD60 and OPCD61 of the 3-byte length, the instruction mnemonics of the instruction I are MOV M60 and M61. From now on, operations similar to those described above are repeated. The instruction having the first and second bytes of its instruction code fetched from the instruction queue at the frames 035 and 036, respectively, is one having an instruction code of the 2-byte length, and the instruction codes are those resulting from the twice pre-fetches subsequent to the pre-fetch of the instruction I, i.e., at the frames 027 and 028, and 029 and 030 so that they are OPCD70 and OPCD71, which can be inversely assembled to establish MOV M70 and M71.

Next, in case the instruction executed by the A processor has an operand in the memory or I/O outside of the A processor, the real value of said operand, i.e., what data is accessed to and for which address the access is conducted has to be traced. This will be described in the following by taking up the instruction I as an example. The instruction I is a transfer one requiring the read operand M61 and the write operand M60 in the memory. The read operand of the instruction is read out from the memory by the advanced reading function of the read operand of the A processor after the instruction has been decoded at the instruction decoding unit 907 and before the end of the instruction execution of the instruction I at the instruction execution unit 910. If, however, the address of the read operand of MOV M60 and M61 of the instruction I is obtained by an indirect addressing, its value will not appear positive in the instruction code of the instruction I. This makes it impossible to identify which frame of the several frames exhibiting the memory read (as indicated by MR in the BUS-STS column) in the dump list of Table 5 is conducting the memory read for reading the read operand of the instruction. Table 5 has four memory reads at the frames 003 and 004, at the frames 010 and 011, at the frames 033 and 034, and at the frames 037 and 039. Since the memory reads at the frames 003 and 004 and at the frames 010 and 011 fall prior to the frame 031 at which the instruction of the instruction I is to be decoded, it is apparent that the memory reads at the frames 003 and 004 and at the frames 010 and 011 do not belong to the memory read bus cycle for reading the read operands of the instruction I from the memory. The frames of both the memory reads at the frames 033 and 034 and at the frames 037 and 039, which are subsequent to the frame 031 for decoding the instruction I, and the memory reads, which will appear on and after the frame 039, although not presented in Table 5, may possibly belong to the memory read bus cycle for reading out the read operands of the instruction I from the memory. It is neither possible to identify which of the frames belongs to the memory read bus cycle for the read operands of the instruction I. As a result, although the mnemonics of the instruction I could be obtained, the operations of the instruction I cannot be completely restored because there is no information indicating what value the instruction I deduced from a read operand and which address the instruction I took that value from.

There has been described hereinbefore the instruction tracing method of the prior art, in which it is necessary and sufficient to output both the information indicating the status of the instruction code pre-fetch queue inside of the information processing system having the instruction code pre-fetching function only and the information indicating the kinds of the bus cycles from the information processing system to the outside of said system so that the instruction execution may be traced by the means disposed outside of said system. The instruction tracing method thus far described, however, is accompanied by a drawback that it is ineffective for a high-performance information processing system which has the multi-stage pipeline structure and has the instruction code pre-fetching function, the read operand advanced-reading function, and the write operand post-writing function.

SUMMARY OF THE INVENTION

It is, therefore, an object of the present invention to provide an information processing system which is freed from the above-specified drawback of the prior art.

Another but more specific object of the present invention is to provide a processor having a multi-stage pipeline structure, which is enabled to have its instructions traced completely by having functions to read the read ones of the external operands of the processor in advance and to write the write operands later, so that it can have its software developing and debugging efficiency improved drastically.

According to a major aspect of the present invention, there is provided a microprocessor having a multi-stage pipeline structure, comprising: a status flip-flop having its output changing when the instruction code of a predetermined instruction is decoded in the microprocessor; a unit for outputting the output of the status flip-flop in synchronism with the output timing of an address for the bus cycle period of the microprocessor; and a unit for sequentially storing the information, which appears at the input/output terminals of the microprocessor, as time-series data outside of the microprocessor, wherein the improvement resides in that the time-series data is edited by discriminating which the bus cycle of the microprocessor belongs to the bus cycle following an instruction on or before the predetermined instruction for changing the output of the status flip-flop or the bus cycle following an instruction on or after the predetermined instruction, with reference to the information outputted from the status flip-flop inside of the microprocessor to the outside of the microprocessor.

According to another aspect of the present invention, there is provided an information processing system including a microprocessor having a multi-stage pipeline structure, comprising:

status indicating unit having its output changing when a predetermined instruction code is decoded;

output unit for outputting the output of the status indicating unit to the microprocessor in synchronism with the output timing of an address during a bus cycle period of the microprocessor; and storage unit for storing the informations outputted from the microprocessor sequentially as time-series data, wherein the improvement resides in that the time-series data is edited by discriminating which the bus cycle of the microprocessor belongs to a bus cycle following an instruction on or before the predetermined instruction for changing the output of the status indicating unit or a bus cycle following an instruction on or after the predetermined instruction, with reference to the output information of the status indicating unit.

In one embodiment, the microprocessor includes: an instruction decoding unit having an instruction decoder for decoding the instruction code, an instruction code register for latching the instruction code being decoded, and a sequencer for controlling the action thereof; an address generator for generating addresses in response to the output of the instruction decoding unit; and a bus control having an address bus interface part for outputting a predetermined address, a data bus interface part for administering data communications between the data bus of the system and the microprocessor, and a bus cycle control part for controlling the bus cycle of the microprocessor, the output of the bus status and the input/output of signals to and from the microprocessor.

Specifically, the address bus interface part has a group of address registers for latching the addresses, and the data bus interface part has a plurality of read temporary registers for temporarily storing data fetched from the system data bus, and a temporary register for temporarily storing the data generated in the microprocessor.

Furthermore, the status indicating unit includes a toggle flip-flop disposed in the instruction decoding unit and having its output inverted in response to each decoding of a branch instruction.

In addition, the output unit includes a signal line for outputting the output of the toggle flip-flop the storage unit includes a group of registers corresponding to the respective registers of the address bus interface part in a one-to-one relation.

Further, the information processing system can also comprises a signal line for outputting therethrough a selected signal of the outputs of the grouped registers to the outside of the microprocessor.

According to a third aspect of the present invention, there is provided an instruction tracing method, which is used with a multi-function processor implementing a multi-stage pipeline structure and including an address generator, a bus control and an instruction decoding unit for determining the sequence of the instruction processing of each of the stages, the instruction decoding unit having a toggle flip-flop therein for having its output inverted when the instruction code of a predetermined kind of instruction is decoded, comprising the steps of:

storing an address generated by the address generator in one of address registers of the bus control and simultaneously the status of the toggle flip-flop in the extensions of the address registers;

outputting that address of the address registers, which is selected when the bus control starts a bus cycle, to the address bus terminal of the processor and the information of the extensions of the address registers to the information output terminal of the processor;

sequentially fetching the signal appearing on the information output terminal in an instruction tracer for the processor, together with the signal appearing on the address bus of the processor, to a tracer buffer of the instruction tracer; and causing an instruction mnemonic and an operand access of the instruction outside of the processor to correspond to each other with reference to the information, which is outputted together with the address from the extensions of the address registers to the outside of the processor, when in the instruction tracing of the processor for the advanced read of read operands and for the post-write of write operands.

BRIEF DESCRIPTION OF THE DRAWINGS

Other objects, features and advantages of the present invention will become apparent from the following description taken in conjunction with the accompanying drawings, in which:

FIGS. 5A and 5B are diagrams showing the dump list of the trace buffer memory of an instruction tracer used with the processor of FIG. 4;

FIG. 8 is a diagram showing the edited result of the content of the trace buffer memory of FIG. 5;

FIG. 11 is a diagram showing a test program;

FIG. 12 is a diagram showing the in-memory location of the test program of FIG. 11.

DESCRIPTION OF THE PREFERRED EMBODIMENT

Figure 1:
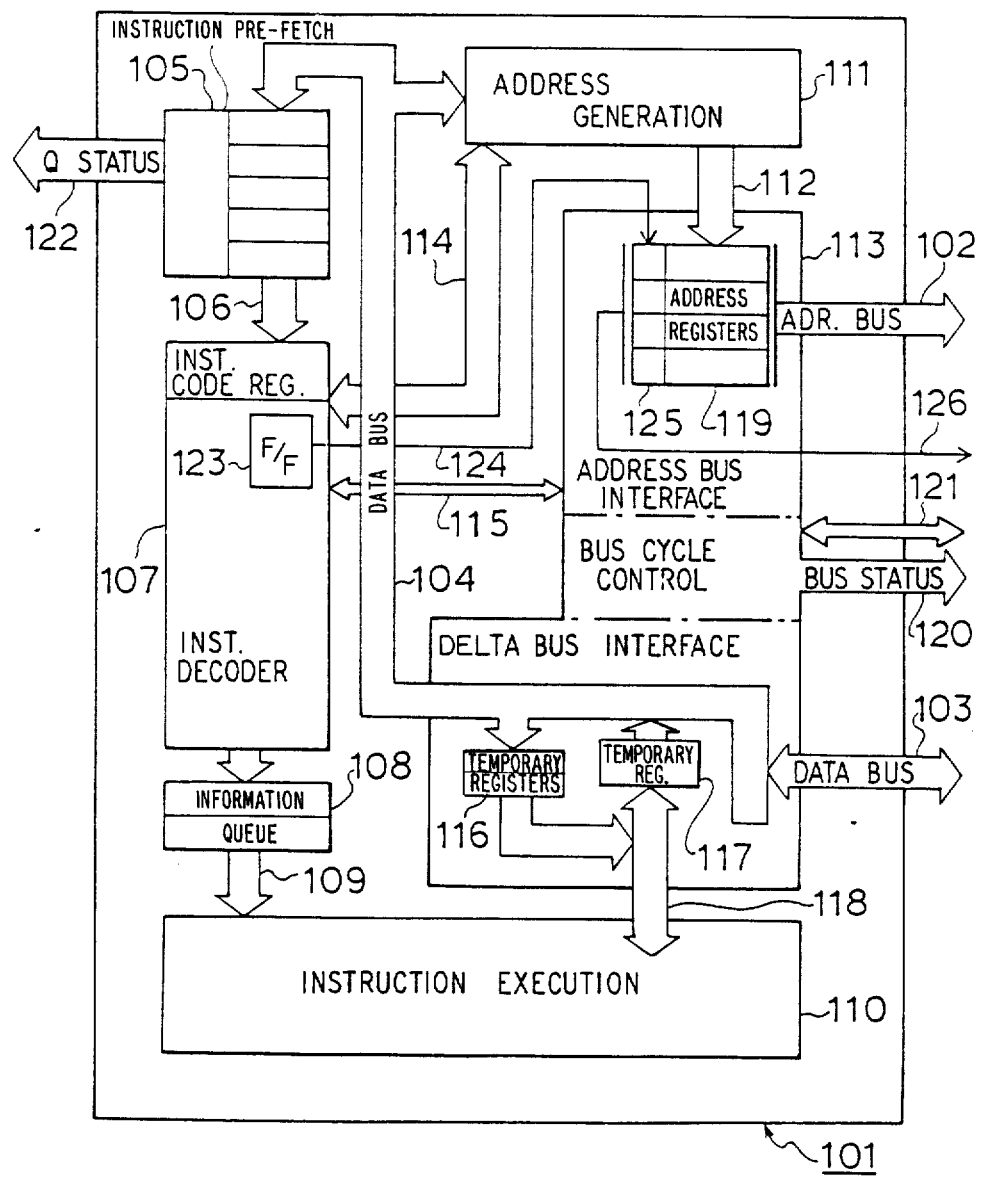
FIG. 1 is a block diagram showing the internal structure of a processor according to one embodiment of the present invention.

FIG. 1 is a block diagram showing one embodiment of the present invention. In FIG. 1: reference numeral 101 designates a microprocessor chip; numeral 102 an address bus signal line of the processor 101; numeral 103 a data bus signal line of the processor 101; numeral 104 a data bus in the processor 101; and numeral 105 an instruction pre-fetch of the processor 101, which is composed of an instruction queue of the FIFO structure for latching an instruction code of several bytes, and an instruction queue control. Numeral 106 designates a signal line for transferring the instruction code at the head of the instruction queue in the instruction pre-fetch 105 to an instruction decoding unit 107. This instruction decoding unit 107 is composed of an instruction code register for latching an instruction code of several bytes being decoded, an instruction decoder and a sequencer for controlling the action of the instruction decoding unit 107. Numeral 108 designates a decoded information queue of the FIFO structure for one of the informations obtained by the decoded result at the instruction decoding unit 107 which will instruct the action of an instruction execution unit 110. Numeral 109 designates a signal line for transmitting the information from the decoded information queue 108 to the instruction execution unit 110. This instruction execution unit 110 is constructed of a hardware composed of an arithmetic and logical circuit and a variety of registers. Numeral 111 designates an address generator for conducting address calculations in response to the information and command from the instruction decoding unit 107. Numeral 112 designates a signal line for transmitting the address generated in the address generator 111 to an address bus interface part of a bus control 113 for the processor 101. This bus control 113 is divided roughly into three major parts: the address bus interface part, a data bus interface part and a bus cycle control part. The address bus interface part has a function to output a predetermined address from the address bus 102 of the processor 101 to the address bus of an information processing system including the processor 111 and is composed of a hardware of á group of address registers 119 for latching a variety of addresses. The data bus interface part is a part for administering data communications between the system data bus and the processor 101 through the data bus 103 of the processor 101 and has a hardware composed of: read temporary registers 116 for temporarily storing data fetched from the system data bus via the data bus 103, and a temporary register 117 for temporarily storing the data generated in the processor 101 prior to the data output when the data is to be outputted to the system data bus. The bus cycle control part of the bus control 113 has functions to control the bus cycle of the processor 101, the output of the bus status and the input/output of signals to and from the external terminals of the processor 101. Numeral 115 designates a signal line, through which the instruction decoding unit 107 feeds the information assigning an action to the bus control and through which the bus control 113 transmits the information of its internal status to the instruction decoding unit 107. Numeral 114 designates a bundle of signal lines, through which the instruction decoding unit 107 feeds the address generator 111 with both the information necessary for address generations and the information for assigning the action of the address generator 111 and through which the address generator 111 transmits the information of its internal status to the instruction decoding unit 107. Numeral 118 designates a signal line for transferring therethrough the data generated in the instruction execution unit 110 to the write temporary register 117 of the data bus interface part in the bus control 113 and from the read temporary registers 116 of the data bus interface part in the bus control 113 to the instruction execution unit 110. Numeral 120 designates a bus status signal line of the processor 101, and numeral 121 designates a bundle of signal lines for outputting a memory I/O signal (i.e., MMIO) and a read/write signal (i.e., RDWR) to the outside of the processor 101. Numeral 122 designates a queue status signal line of the processor 101. Numerals 123, 124, 125 and 126 are newly provided hardwares for implementing the present invention. The hardware 123 is a toggle flip-flop disposed in the instruction decoding unit 107 and having its output inverted each time a branch instruction is decoded in the instruction decoding unit 107. The hardware 124 is a signal line for the output signal of the toggle flip-flop 123. The hardware 125 is a group of registers which correspond one-to-one to the respective registers of the group in the address bus interface part of the bus control 113. The hardware 126 is a signal line for outputting therethrough a selected signal of the outputs of the grouped registers 125 to the outside of the processor 101.

Figure 9:
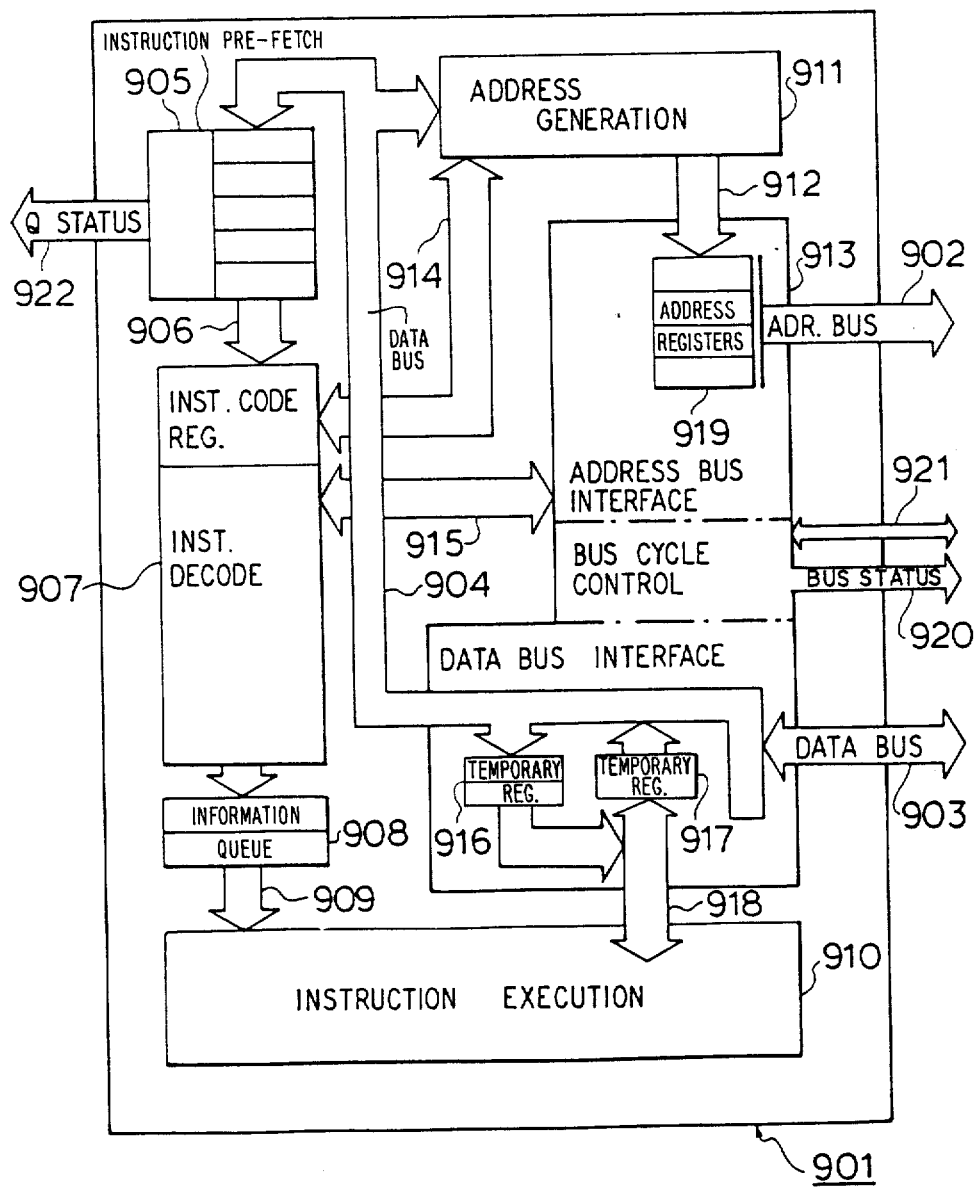
FIG. 9 is a block diagram showing the internal structure of an A processor having the pipeline structure.
Figure 10:
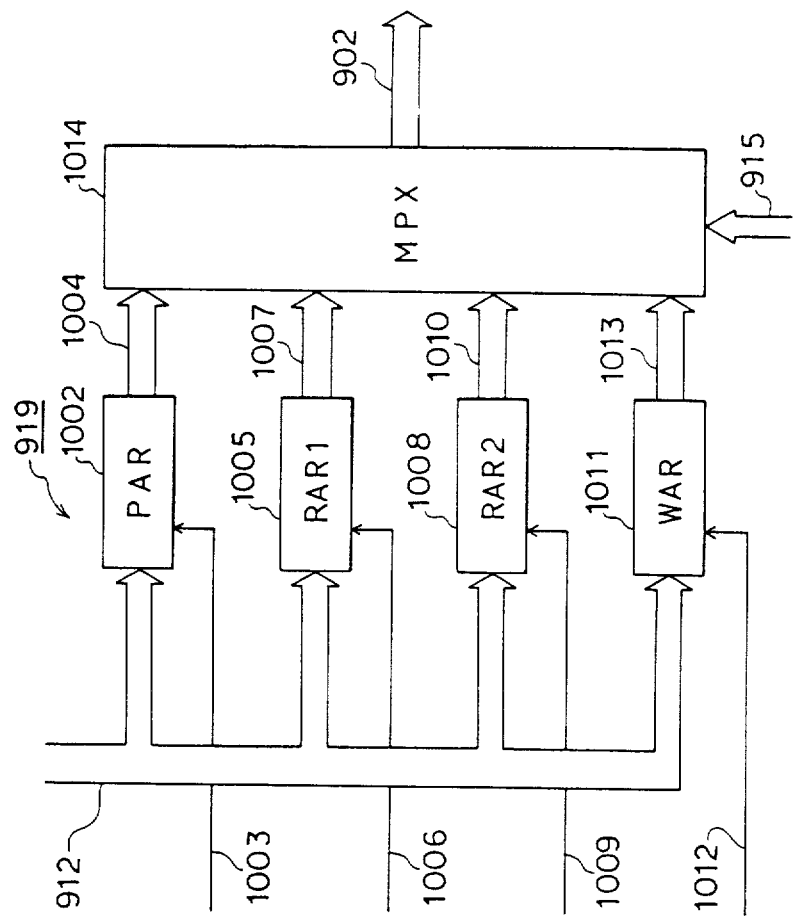
FIG. 10 is a detailed block diagram showing the internal structure of registers of the A processor shown in FIG. 9.

The processor 101 according to the present embodiment is constructed by adding the toggle flip-flop 123, the signal line 124, the grouped registers 125 and the output signal line 126 to the structure of the A processor shown in FIG. 9 so that it contains all the functions of the A processor, e.g., the instruction code pre-fetching function, the read operand advanced-reading function and the write operand post-reading function.

Figure 2:
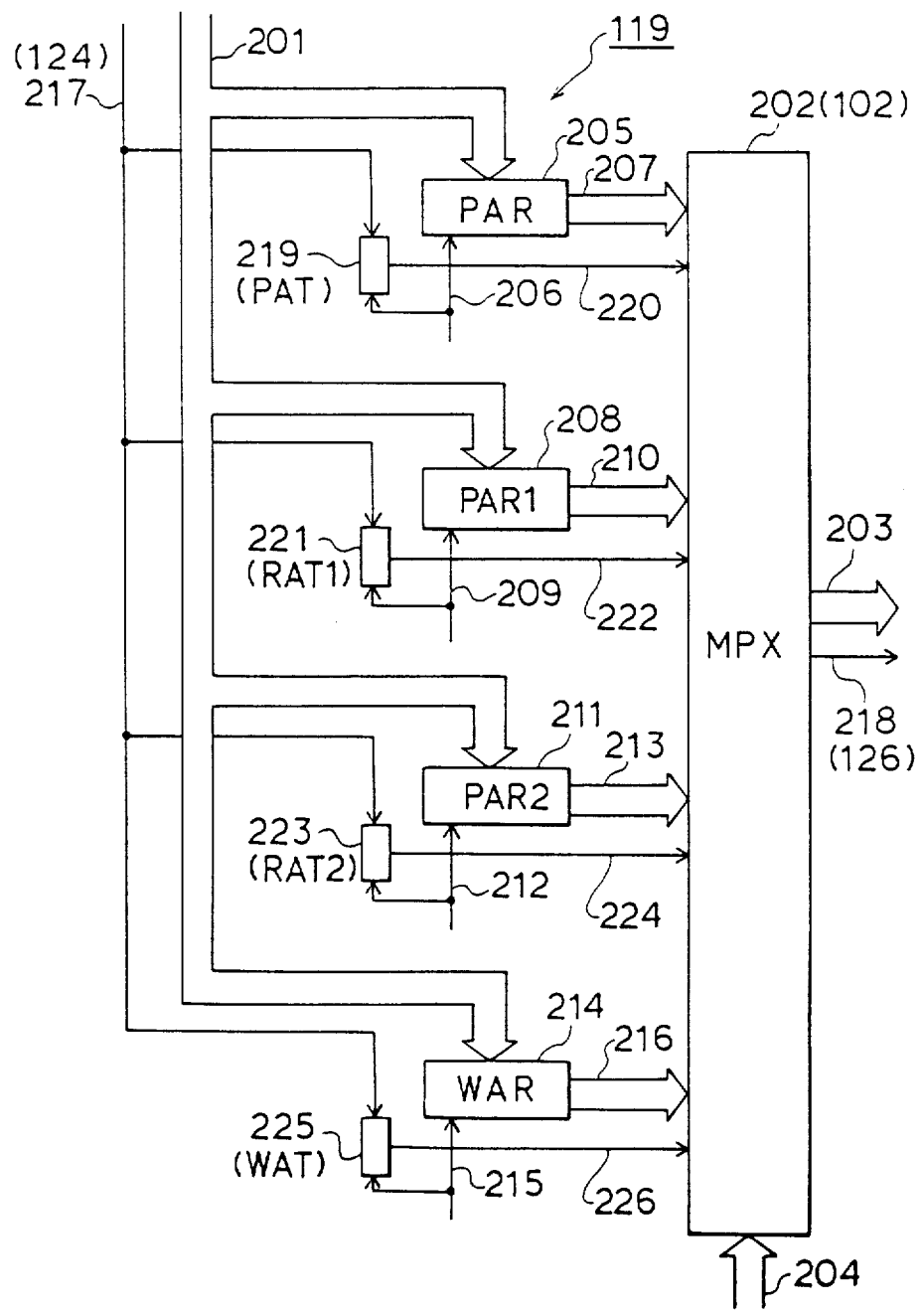
FIG. 2 is a detailed block diagram showing a group of address registers in the address bus interface part of the processor of FIG. 1.

FIG. 2 is a block diagram showing a major portion of the address bus interface part of the bus control 113 in the processor 101. Reference numeral 201 designates a signal line corresponding to the signal line 112 of FIG. 1 for transferring addresses generated by the not-shown address generator. Numerals 205, 208, 211 and 214 designate a group of registers, of which: the register 205 is a pre-fetching address register (PAR); the register 208 is a read operand address register (RAR1), the register 211 is a road operand address register (RAR2); and the register 214 is a write operand address register (WAR). Numerals 206, 209, 212 and 215 designate the respective latch signals of the registers 205, 208, 211 and 214 corresponding to the registers 119 of FIG. 1. Numeral 207 designates the output signal line of the register 205; numeral 210 the output signal line of the register 208; numeral 213 the output signal line of the register 211; and numeral 216 the output signal line of the register 214. Numeral 217 designates a signal line which is newly added in the present invention and which corresponds to the signal line 124 of FIG. 1. Numerals 219, 221, 223 and 225 designate registers, of which the registers 219, 221, 223, and 225 may be thought to be the respective extensions of the registers 205, 208, 211 and 214. Numerals 220, 222, 224, and 226 designate the output signal lines of the registers 219, 221, 223 and 225, respectively. Numeral 202 designates a multiplexor which is made receptive of both four addresses, i.e., the addresses outputted from the registers 205, 208, 211 and 214, respectively, and four signals i.e., the signals outputted from the registers 219, 221, 223 and 225, respectively, for selecting one of the four addresses in response to a selection signal 204 to output it to an address output signal line 203 and to output the output signal from the register extension, which corresponds to the register having latched that selected address, to a signal line 218. When the address outputted from the register 208 is selected in response to the selection signal 204, for example, the content of the register 221 is selected and outputted to the signal line 218. The signals 204, 206, 209, 212 and 215 are generated in the not-shown instruction decoding unit and sent through the signal line 115 of FIG. 1 to the bus control. The signal line 203 corresponds to the address bus 102 of FIG. 1, and the signal line 218 corresponds to the signal line 126 of FIG. 1. Only the register PAR 205 has a function to automatically updating the addresses. For simplicity of the following description, the extension of the register PAR 205 or the portion 219 for latching the information on the signal line 217 is denoted at PAR; the extension 221 at RAT1 in contrast to the register RAR1 208; the extension 223 at RAT2 in contrast to the register RAR2 211; and the extension 225 at WAT in contrast to the register WAR 214.

Figure 3:
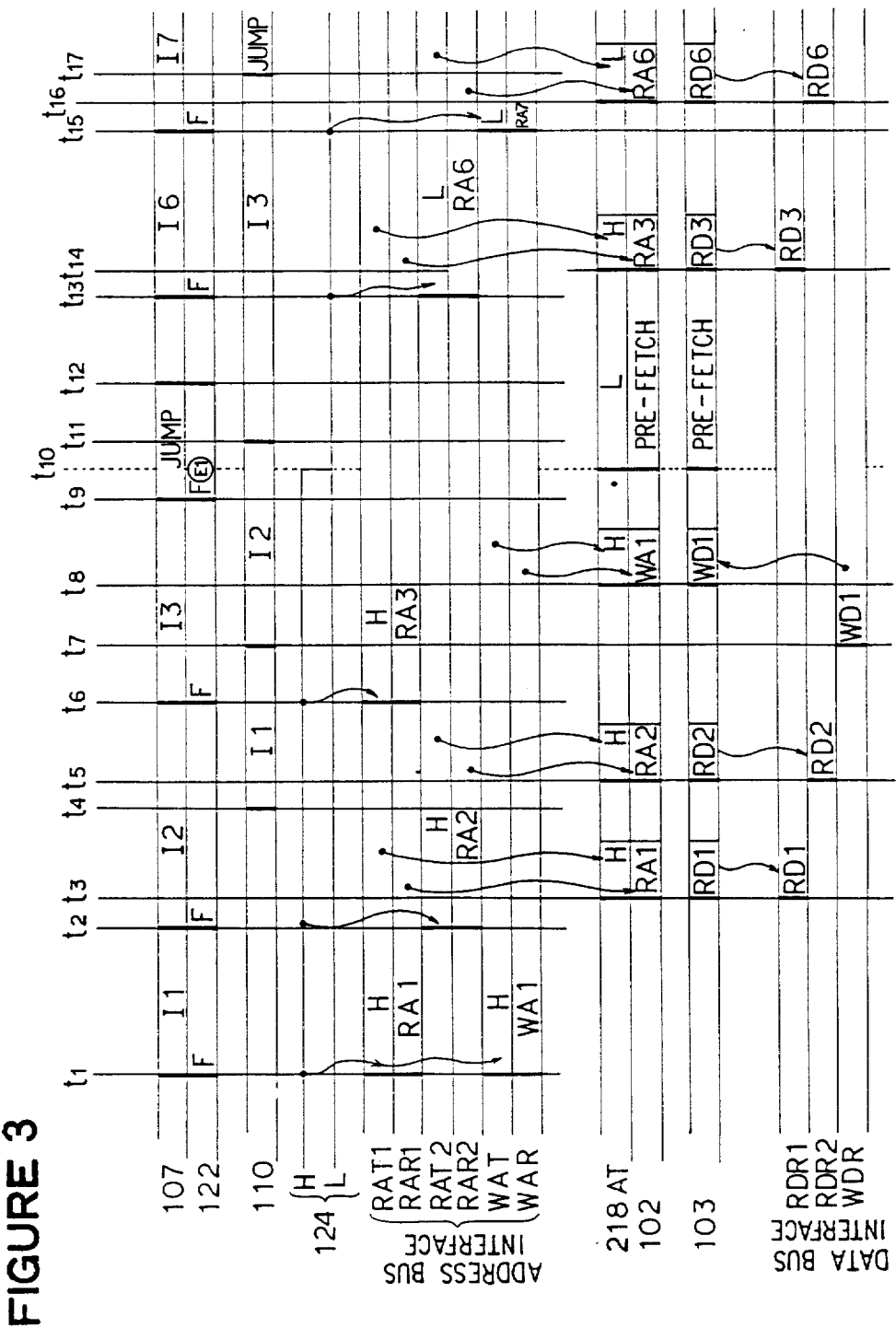
FIG. 3 is a timing chart showing the operations of the processor shown in FIGS. 1 and 2.
Figure 4:
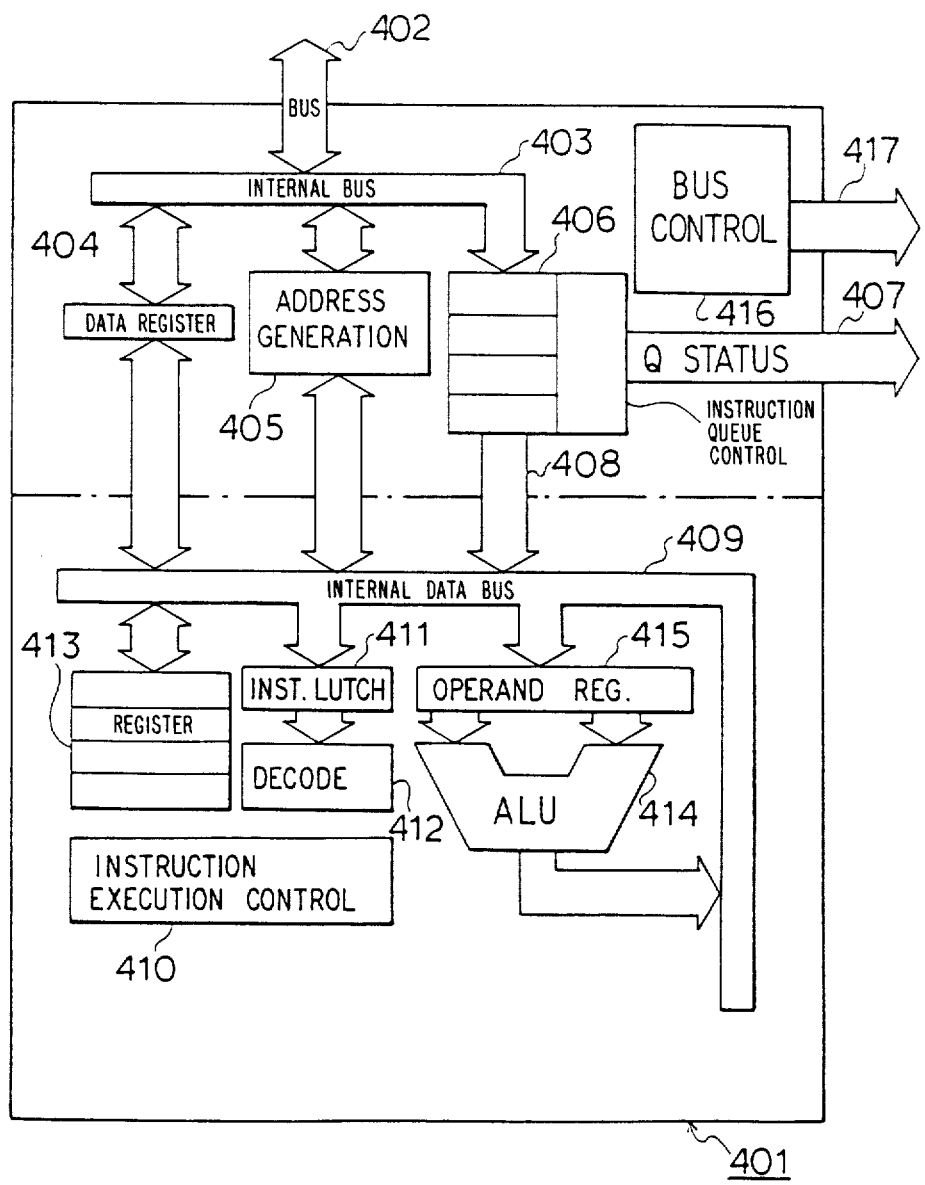
FIG. 4 is similar to FIG. 1 but shows the internal structure of the processor according to the prior art.
Figure 6:
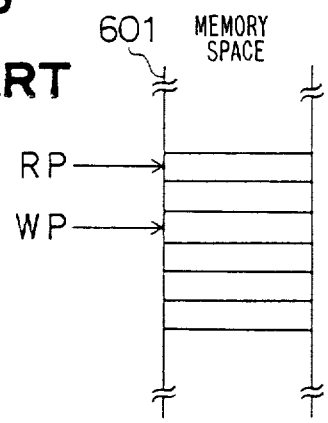
FIG. 6 is a diagram showing the structure of a pseudo queue used in the processor of FIG. 4.
Figure 7:
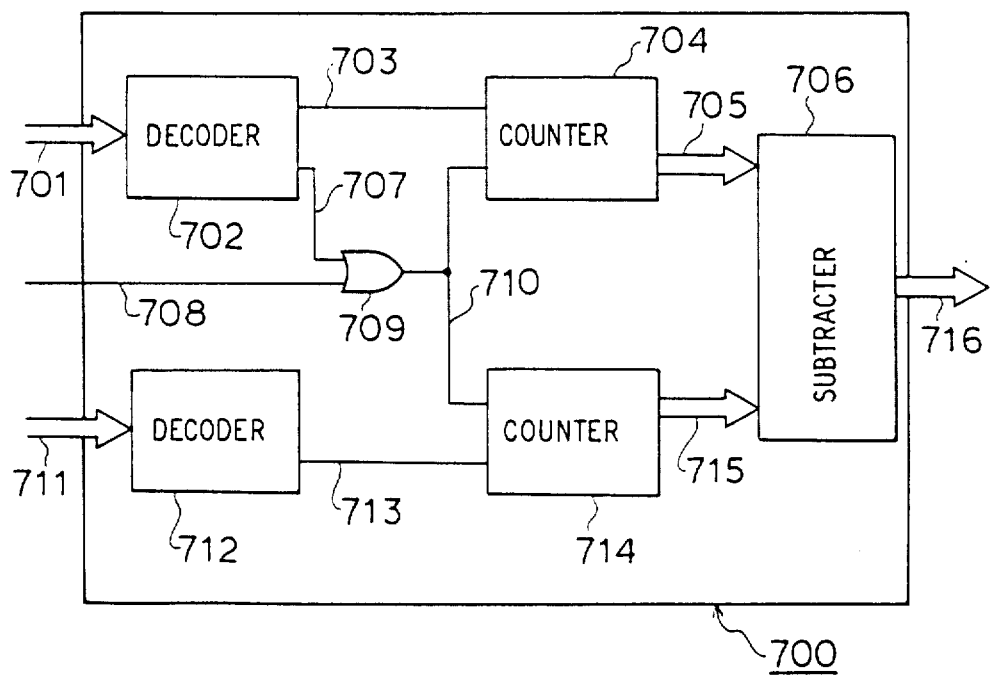
FIG. 7 is a block diagram showing a circuit disposed in the instruction tracer for calculating the depth of the queue.
Figure 13:
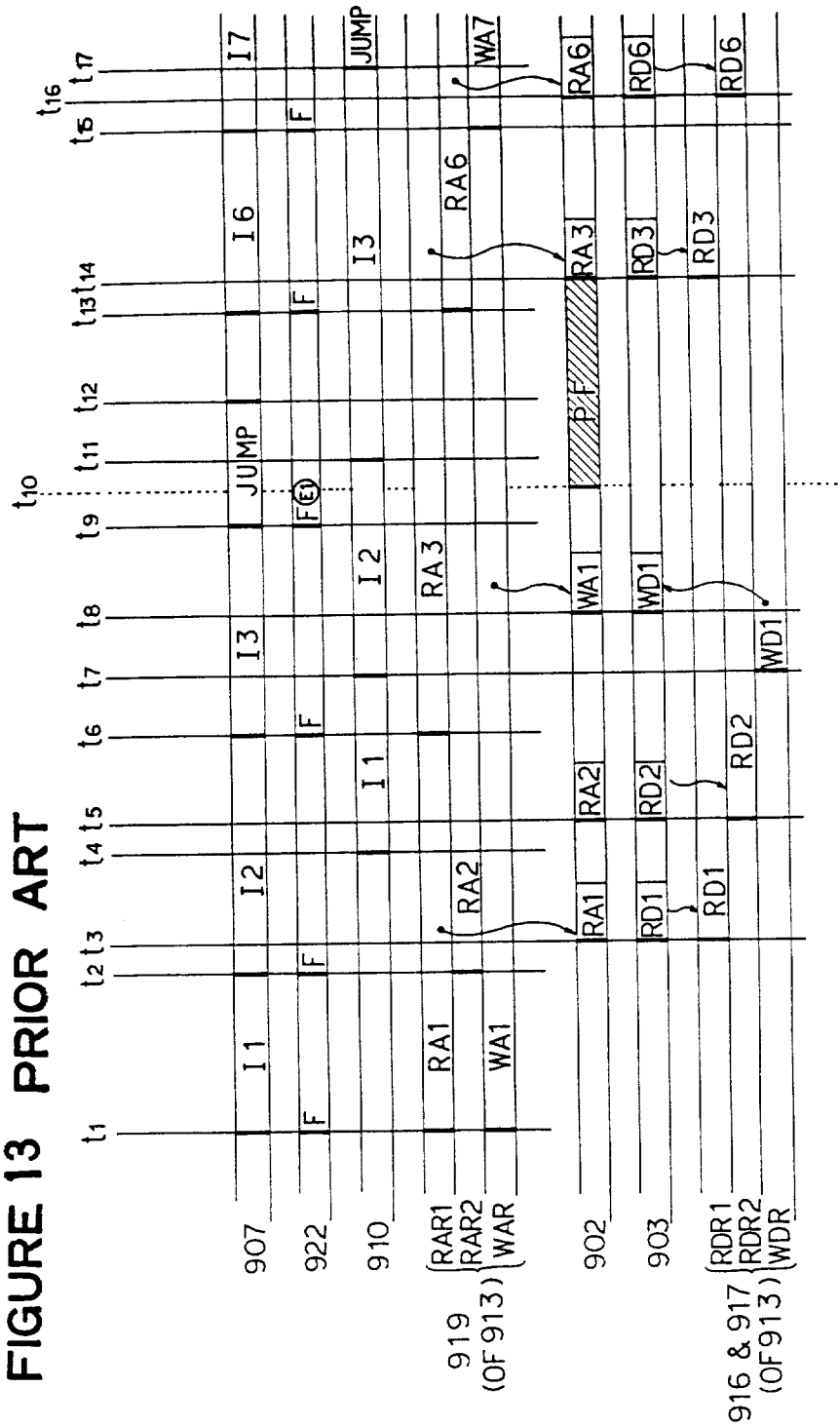
FIG. 13 is a timing chart showing the operations of the A processor of FIG. 9.

FIG. 3 is a schematic timing chart corresponding to that of FIG. 13. In order to facilitate the comparison with the example of the prior art, the timing chart of FIG. 3 is assumed such that the program of FIG. 11 written with the instructions having the instruction mnemonics and codes of assembly languages listed up in Table 3 be assembled and stored in the memory, as shown in FIG. 12, and shows the timing relationships among the informations appearing inside and at the external bus terminals of the processor 101 when the processor 101 executes a series of instructions in the neighborhood of the memory ADR10 of FIG. 12. Since the processor 101 contains all the major functions of the aforementioned A processor, the instruction processing timings of the instruction decoding unit 107, the queue status 122 and the instruction execution unit 110, the changing timings of the contents of the registers RAR1, RAR2, WAR, RDR1, RDR2 and WDR, and the changing timings of the informations appearing on the address bus 102 and the data bus 103, as shown in FIG. 3, are similar to those of FIG. 13, respectively. Here, the functions added newly according to the present invention will be described in the following.

In FIG. 3, the toggle output represents the signal level on the signal line 124 for the output signal of the toggle flip-flop 123 which is newly added to the instruction decoding unit 107 of FIG. 1 in accordance with the present invention. The toggle output is assumed to take the high (H) level at the time t1 when the decoding of the instruction I1 is started at the instruction decoding unit 107.

If the decoding of the instruction code of 2 bytes of the instruction JUMP is started at t9 in the instruction decoding unit 107 so that the instruction JUMP is found at t10 to be an unconditional branch instruction, the output of the toggle flip-flop 123 is inverted to take the low (L) level. After t10, the output of said toggle flip-flop 123 remains at the low level until t17 of FIG. 3 at the earliest. When the instruction I3 requiring the read operand M31 in the memory outside of the processor 101 is decoded at t6 in the instruction decoding unit 107, this unit 107 commands the address generator 111 to generate the address RA3 of the read operand M31 of the instruction I3 and transfer it to the bus control 113. Simultaneously with this, the instruction decoding unit 107 commands the bus control 113 to latch the address RA3 of the read operand M31 transferred from the address generator 111 in the read operand address register RAR1 in the address bus interface part of the bus control 113. This command to the bus control 113 is issued by activating the latch signal of the address register RAR1 208 on the latch signal line 206 while the address generator 111 is outputting the address RA3 to the signal line 201 of FIG. 2. When the latch signal on the latch signal line 206 turns active, the address RA3 on the signal line 201 is latched in the address register RAR1, and the signal taking the high level at t6 on the signal line 217 is simultaneously latched in the register RAT1 221. In other words, simultaneously as the information on the signal line 201, i.e., the address RA3 is sampled and latched in the register RAR1 at t6 of the schematic timing chart of FIG. 3, the output of the toggle flip-flop 123 disposed in the instruction decoding unit 107 is sampled and latched in the register RAT1. At t10, the toggle flip-flop 123 has its output inverted as a result that the instruction code of the unconditional branch instruction is decoded at the instruction decoding unit 107. After this, since the instruction I6 to be decoded at t13 in the instruction decoding unit 107 also requires the read operand M61 outside of the processor 101, at t13 like the aforementioned case of the instruction I3, the address RA6 of the read operand M61 of the instruction I6, which is generated at the address generator 111, is latched in the register RAR2, and the output of the aforementioned toggle flip-flop 123 at the low level is simultaneously sampled and latched in the register RAT2. At t14, the bus control 113 starts the memory read bus cycle for the advanced read of the read operand M31 of the instruction I3 by the use of the address RA3 of that read operand M31 latched in the register RAR1. At t14, in response to the selection signal on the signal line 204, as shown in FIG. 2, the address RA3 of the read operand M31 of the instruction I3 being outputted from the register RAR1 is selected as the output of the two output signal lines of the multiplexor 202 and outputted to the address bus 203. Simultaneously with this, the signal at the high level being outputted from the register RAT1 is selected and outputted to the signal line 218. At t14, as shown in FIG. 1, the address RA3 is outputted to the address bus 102, and the high-level signal latched in the register RAT1 is simultaneously outputted to the signal line 126. At t14, the address RA3 is outputted to the column of the address bus 102 of FIG. 3, and the high-level signal is outputted to a column AT of FIG. 3 corresponding to the signal line 218 of FIG. 2.

Starts subsequently, at t16, the bus control 113 the memory read bus cycle for the advanced read of the read operand M61 of the instruction I6 by the use of the address RA6 of the operand M61. At t16, more specifically, the address RA6 of the read operand M61 of the instruction I6 is outputted to the address bus 102 of FIG. 1, the address output signal line 203 of FIG. 3 and the column of the address bus 102 of FIG. 3. Simultaneously with this, the low-level signal latched in the register RAT2 is outputted to the signal line 126 of FIG. 1, the signal line 218 of FIG. 2 and the column AT of FIG. 3. If, on the other hand, it is found that the instruction code decoded at t6 in the instruction decoding unit 107 belongs to the unconditional branch instruction, all the instruction codes pre-fetched in the instruction queue of the instruction pre-fetch 105 are made ineffective. In the processor 101, as in the A processor, the pre-fetch of the instruction code from the branched address, which is indicated in the instruction code of the unconditional branch instruction, acquires the highest priority for occupying the external buses. At t10, the instruction decoding unit 107 commands the address generator 111 to transfer the branching information indicated in the instruction code of the instruction JUMP via the signal line 114 and to generate and transfer said branched address ADR 60 to the bus control 113. The instruction decoding unit 107 also commands the bus control 113 to latch the branched address ADR60 transferred from the address generator 111 in the register PAR and to start the pre-fetch of the instruction code by the use of the content of the register PAR. Here, simultaneously as the branched address ADR60 indicating the branching by the instruction JUMP and transferred from the address generator 111 to the bus control 113 is latched in the address PAR 205, the signal on the output signal line 217 of the toggle flip-flop 123 in the instruction decoding unit 107 is latched in the extension PAT 219 of the register PAR 205. As has been described hereinbefore, the register PAR 205 has an automatic address updating function so that its content is updated at each end of the memory read bus cycle for the pre-fetch of the instruction code after the branched address ADR60 indicating the branching by the instruction JUMP has been latched at t10.

On the contrary, however, the content of the register extension PAT 219 remains unchanged independently of said automatic address updating function of the register PAR 205 until a new address is subsequently set in the register PAR 205 in response to the command from the instruction decoding unit 107. In response to the information on the selection signal line 204, the multiplexor 202 of the address bus interface part of the bus control 113 selects not only the register PAR 205 for the pre-fetching action to output the content of the register PAR 205 to the address bus terminal 203 but also the register extension PAT 219 to output the content of the extension PAT to the signal line 218. Since, in the embodiment of FIG. 3, the signal existing on the signal line 217 and taking the low level at t10 is sampled to the register extension PAT 219, the signal AT outputted at the same timing as the address from the signal line 126 by the instruction code pre-fetching action immediately after the branch instruction from t10 to t13 is left at the low (L) level.

In the present embodiment, the output of the toggle flip-flop 123 in the instruction decoding unit 107 changes if the instruction code of the unconditional branch instruction is decoded in the instruction decoding unit 107. Here, the unconditional branch instruction is selected as a factor for changing the output of the toggle flip-flop 123 because it is used statistically once for about ten steps in the ordinary program. If, on the contrary, an instruction to be rarely used is adopted as a factor for changing the output of the toggle flip-flop 123, the signal AT will not change even once in the infinite trace buffer memory of the instruction tracer, thus making the present instruction trace impossible. It is, therefore, recommended to use either an instruction which will appear once for several to several tens of steps or an instruction which can be forcibly inserted by that step cycle.

The actions of the hardware newly added by the present invention to the A processor implementing the high-grade pipeline structure have been described hereinbefore. Next, the instruction tracing method to be used when a software is to be developed by the processor 101 implementing the present invention will be described in the following. The instruction tracing method of the present invention is enabled to basically solve the serious problem concomitant with the instruction tracing method in the aforementioned case of the A processor by adding the informations obtainable from the novel hardware of the present invention to the instruction tracing method of the prior art.

The instruction tracer according to the instruction tracing method of the present invention is required, like the aforementioned instruction tracer of the A processor, to have: the trace buffer memory break point setting function to sample and latch sequentially as the time-series data the informations on the address bus 102, the necessary control signals, the status signals and the signals outputted from the signal line 126 while the processor is executing the series instructions; and the editing function to edit the time-series informations in the trace buffer memory. The instruction tracing method of the present invention is similar to the aforementioned one of the A processor in that the instant when the queue status indicates that all the contents of the instruction queue have been made ineffective in the trace buffer memory is used as the reference point for the instruction trace, and in that the time-series data in the trace buffer memory are traced from said reference point of the present instruction tracing method to select and inversely assemble the instruction code of one instruction, which has been executed immediately after said reference point, thereby to establish the mnemonics of the instruction executed immediately after said reference point. Here will be described both the instruction mnemonics, which are obtained by the aforementioned assembly of the instructions accompanied by the memory or the I/O access, and the method of causing the addresses and data accessed actually by said instruction to correspond to the instruction mnemonics.

Assuming that the program shown in FIG. 11 be assembled and stored in the memory, as shown in FIG. 12, the description will be made in the following on the method of conducting the instruction trace by the use of the instruction tracer for the processor 101 when the A processor executes the series instructions from the neighborhood of the memory address ADR10 of FIG. 12. Table 7 presents the dump list of a portion of the content of the trace buffer memory of the instruction tracer for the processor 101 and has its list shared substantially with Table 5.

TABLE 7

| FRAME | ADDRESS | AT | DATA | BUSSTS | QSTS4 | QSTS3-0 | |
|-------|---------|-----|--------|--------|-------|---------|-----|
| 001 | | | | | | F | t2 |
| 002 | | | | | | S | |
| 003 | RA1 | H | | MR | | | t3 |
| 004 | | | RD1 | MR | | | |
| 005 | | | | | H | | t4 |
| 006 | ADR41 | H | | F | | | |
| 007 | | | OPCD41 | F | | | |
| 008 | ADR50 | H | | F | | | |
| 009 | | | OPCD50 | F | | | |
| 010 | RA2 | H | | MR | | | t5 |
| 011 | | | RD2 | MR | | | |
| 012 | | | | | | F | t6 |
| 013 | | | | | | S | |
| 014 | | | | | H | | t7 |
| 015 | ADR51 | H | | F | | | |
| 016 | | | OPCD51 | F | | | |
| 017 | WA1 | H | | MW | | | t8 |
| 018 | | | WD1 | MW | | | |
| 019 | | | | | | F | t9 |
| 020 | | | | | | S | |
| 021 | | | | | | E1 | t10 |
| 022 | | | | | H | | t11 |
| 023 | ADR60 | L | | F | | | |
| 024 | | | OPCD60 | F | | | |
| 025 | ADR61 | L | | F | | | |

TABLE 7-continued

| FRAME | ADDRESS | AT | DATA | BUSSTS | QSTS4 | QSTS3-0 | |
|-------|---------|----|----|--------|-------|---------|---|
| 026 |  |  | OPCD61 | F |  |  |  |
| 027 | ADR70 | L |  | F |  |  |  |
| 028 |  |  | OPCD70 | F |  |  |  |
| 029 | ADR71 | L |  | F |  |  |  |
| 030 |  |  | OPCD71 | F |  |  |  |
| 031 |  |  |  |  |  | F | t13 |
| 032 |  |  |  |  |  | S |  |
| 033 | RA3 | H |  | MR |  |  | t14 |
| 034 |  |  | RD3 | MR |  |  |  |
| 035 |  |  |  |  |  | F | t15 |
| 036 |  |  |  |  |  | S |  |
| 037 | RA6 | L |  | MR |  |  | t16 |
| 038 |  |  |  |  | H |  | t17 |
| 039 |  |  | RD6 | MR |  |  |  |

If, in Table 7, the point at which the column QSTS3-0 represents E1 at the frame 021 is used as the reference, the instruction code of an instruction J having an instruction code of 2-byte length decoded at the frames 031 and 032 by the instruction decoding unit 107 by the method used in Table 5 are the instruction codes OPCD60 and OPCD61 of 2 bytes pre-fetched at the frames 023 and 024 and the frames 025 and 026, and the instruction codes OPCD60 and OPCD61 are inversely assembled to establish the instruction mnemonics MOV R6 and M61 as the instruction J. Since the instruction J is a transfer instruction requiring the read operand M61 in the memory, it is necessary for tracing the instruction J to indicate what data is fetched as the read operand M61 of the instruction J and what memory address that data is fetched from. For this necessity, the informations of the column AT added newly to Table 7 are used.

The informations in the column AT store the output status of the toggle flip-flop 123 in the instruction decoding unit 107 when the address outputted to the address terminal 102 of the processor 101 is latched in the address register of the bus control 113. The toggle flip-flop 123 inverts the output at the instant when the instruction code of the unconditional branch instruction is decoded in the instruction decoding unit 107. Since the decoding of the instruction code of the unconditional branch instruction is instantly transmitted to the outside of the processor 101 as a result that the queue status QSTS3-0 represents E1, the column AT takes the high (H) level before the frame 021 and the low (L) level after the frame 021 in view of the value of the column AT when the address for the pre-fetching is outputted before and after the frame 021 at which the queue status QSTS3-0 represents E1. When the instruction code of the transfer instruction J immediately after the decoding of the unconditional branch instruction is decoded in the instruction decoding unit 107 after the frame 021 so that the address of the read operand M61 of the instruction J is generated in the address generator 111 and stored in the grouped address registers of the bus control 113, the output of the toggle flip-flop 123 at the low level is latched in the extensions of said address registers. Therefore, the memory read bus cycle for reading the read operand of the instruction J requiring the read operand M61 in the memory is that memory read bus cycle other than the instruction code pre-fetch, in which the column AT represents L (i.e., low level) first of all the frames after the frame 021. In Table 7, there are located two memory read bus cycles at the frames 033 and 034 and at the frames 037 and 039 after the frame 021. It is, however, the address output at the frame 037 that the column AT first represents L after the frame 021. Therefore, the bus cycle for reading the read operand of the instruction J requiring the read operand M61 in the memory is the memory read bus cycle at the frames 037 and 039. The address of the read operand M61 of the instruction J is determined at RA6 in view of the frame 037, and the data of the read operand M61 is determined at RD6 in view of the frame 039. From now on, likewise, the memory read bus cycle for reading the read operand of an instruction, which requires the read operand in the memory and appears subsequent to the instruction J requiring the read operand and appearing at first after the decoding of the instruction code of the unconditional branch instruction, can be determined to that in which the column AT represents L after the frames 037 and 039. The description thus far described has been directed to the case, in which the instruction has the read operand in the memory, but the method per se of providing correspondences between the instructions and operands of said instruction tracing method can be accomplished completely likewise no matter whether the operands might be in the memory or I/O.

As has been described hereinbefore, the present method contemplates to provide an instruction tracing method, which is used with a multi-function processor implementing a multi-stage pipeline structure and including an address generator, a bus control and an instruction decoding unit for determining the sequence of the instruction processing of each of the stages, said instruction decoding unit having a toggle flip-flop therein for having its output inverted when the instruction code of a predetermined kind of instruction is decoded, comprising the steps of: storing an address generated by said address generator in one of address registers of said bus control and simultaneously the status of the toggle flip-flop in the extensions of said address registers; outputting that address of said address registers, which is selected when said bus control starts a bus cycle, to the address bus terminal of said processor and the information of the extensions of said address registers to the information output terminal of said processor; sequentially fetching the signal appearing on the information output terminal in an instruction tracer for said processor, together with the signal appearing on the address bus of said processor, to a tracer buffer of said instruction tracer; and causing an instruction mnemonic and an operand access of said instruction outside of said processor to correspond to each other with reference to the information, which is outputted together with the address from the extensions of said address registers to the outside of the processor, when in the instruction tracing of the processor for the advanced read of read operands and for the post-write of write operands.

In Table 7, RA1, ADR41, . . . , appearing in the ADDRESS column represent the addresses outputted to the address bus 102 by the processor 101, and RD1, OPCD41, . . . , and so on appearing in the DATA column represent the data appearing on the data bus 103 by inputting and outputting the data to and from the processor 101. The BUS-STS column represents the bus status codes, which are outputted to the bus status terminal 120 by the processor 101, and the MMIO and RDWR signals, which are outputted to the signal line 121, in the symbols F, MR and MW only, as listed in Table 6. The letters H and L appearing in the QSTS column represent whether the signals outputted to the QSTS4 terminal 122 are at the high (H) level or at the low (L) level. The QSTS3-0 column represents the queue status signals, which are outputted to the queue status terminal 122 by the processor 101, in the symbols F, S and E1 only, as listed in Table 4. The AT column represents whether the signal, which is outputted to the signal line 126 simultaneously as the processor 101 outputs the address to the address bus terminal 102, is at the high (H) level or at the low (L) level.

As a result, even in case the processor implementing the multi-stage pipeline structure is conducting the advanced read of the read operand of the post-write of the write operands of the instruction requiring the operands outside of that processor, instruction mnemonics of the instructions executed by the processor can be attained in the execution order. In the case of the instruction requiring the operands outside of the processor, the instruction mnemonics and the addresses when the operands are actually accessed to are enabled to correspond to the data.

Incidentally, Table 1 presents the queue status of the aforementioned processor of the prior art. Table 2 presents the bus status of the same processor. Table 3 presents the correspondences between the instruction mnemonics and codes of the programs of the A processor and the processor 101, which are written in the assembly language. Table 4 presents the queue statuses of the A processor and the processor 101. Table 5 presents the dump list of the informations which are stored in the trace buffer memory of the instruction tracer when the A processor sequentially executes the instructions from the neighborhood of the address ADR in the memory shown in FIG. 12. Table 6 presents the bus statuses of the A processor and the processor 101. Table 7 presents the dump list of the informations stored in the trace buffer memory of the instruction tracer when the instructions are executed by the processor 101 sequentially from the neighborhood of the address ADR10 of the memory shown in FIG. 12.

According to the present invention, the processor having the multi-stage pipeline structure and conducting the advanced read of the read ones and the post-write of the write ones of the operands outside of the processor is enabled to have its instructions traced completely so that it can enjoy the effect that its software developing and debugging efficiencies can be drastically improved.

The invention has thus been shown and described with reference to specific embodiments. However, it should be noted that the invention is in no way limited to the details of the illustrated structures but changes and modifications may be made within the scope of the appended claims.

What is claimed is:

1. An information processing system including a microprocessor having a multi-stage pipeline structure, comprising:
    an instruction decoding unit having an instruction decoder for decoding a received instruction code and having status indicating means having an output changing at a real time base when a predetermined instruction code, which can be used as an index in a program trace performed after a program to be tested has been executed, is decoded by said instruction decoder, said status indicating means maintaining said output when an instruction code other than said predetermined instruction code is decoded by said instruction decoder;
    address generating means coupled to said instruction decoding unit to receive at least a portion of a decoded instruction code outputted from said instruction decoder for generating an address for reading and/or writing of an operand required by said decoded instruction code;
    bus control means including first register means coupled to said address generating means for temporarily holding said address for reading and/or writing of said operand required by said decoded instruction code and second register means coupled to said status indicating means for temporarily holding the output of said status indicating means when said decoded instruction code is outputted from said instruction decoder, said bus control means operating, when a bus cycle is started on the basis of said address held in said first register means, to output a content of said second register means to an external of said microprocessor in synchronism with an output timing of said address held in said first register means during a bus cycle period of said microprocessor; and
    storage means for storing information outputted from said microprocessor sequentially as time-series data, said information including said address held in said first register means and said content of said second register means,
    said time-series data is edited by discriminating whether the bus cycle of said microprocessor belongs to a bus cycle following an instruction on or before said predetermined instruction code for changing the output of said status indicating means or a bus cycle following an instruction on or after said predetermined instruction code, with reference to said content of said second register means stored in said storage means and indicating the output information of said status indicating means.

2. An information processing system according to claim 1, wherein said instruction decoding unit also includes an instruction code register coupled to said instruction decoder and for latching said instruction code being decoded so that said instruction decoder decodes said instruction latched in said instruction code register, and
    wherein said bus control means includes an address bus interface part coupled to an external address bus and having said first and second register means for outputting said address held in said first register means and said content of said second register means to an external device of said microprocessor, a data bus interface part coupled to an external data bus for administering data communications between said system and said microprocessor, and a bus cycle control part for controlling the bus cycle of said microprocessor, the output of a bus status and input/output of signals to and from said microprocessor.

3. An information processing system according to claim 2, wherein said data bus interface part has a plurality of read temporary registers for temporarily storing data supplied through said external data bus from the external device of said microprocessor, and a temporary register temporarily storing the data generated in said microprocessor for outputting said generated data through said external data bus to the external device of said microprocessor.

4. An information processing system according to claim 3, wherein said status indicating means includes a toggle flip-flop having an output inverted in response to each decoding of a branch instruction and said second register means is coupled to said toggle flip-flop for temporarily holding an output status of said toggle flip-flop.

5. An information processing system according to claim 4, wherein said bus control means includes a signal line for outputting to the external device of said microprocessor the content of said first register means temporarily holding the output status of said toggle flip-flop.

6. An information processing system according to claim 5, wherein said storage means includes a group of registers corresponding to respective registers of said address bus interface part in a one-to-one relation.

7. An information processing system according to claim 6, wherein said second register means includes a group of extended registers corresponding to the respective registers of said address bus interface part and further comprising a signal line for outputting therethrough a signal of one extended register selected from said extended register group to the external device of said microprocessor.

8. An instruction tracing method, which is used with a multi-function processor implementing a multi-stage pipeline structure and including an address generator, a bus control and an instruction decoding unit receiving a sequence of instruction codes for determining a sequence of an instruction processing of each of a plurality of stages, said instruction decoding unit having a toggle flip-flop therein for having an output status inverted when a predetermined kind of instruction code is decoded, comprising the steps of:
(i) causing said toggle flip-flop to invert said output status at a real time base when said predetermined kind of instruction code, which can be used as an index in a program trace performed after a program to be tested has been executed, is decoded by said instruction decoding unit, but to maintain the output status of said toggle flip-flop when an instruction code other than said predetermined kind of instruction code is decoded by said instruction decoding unit;
(ii) storing an address generated by said address generator in one of a plurality of address registers of said bus control and simultaneously the output status of said toggle flip-flop in a corresponding extended register of extended registers of said plurality of address registers;
(iii) outputting a content of one address register of said address registers, which is selected when said bus control starts a bus cycle, to an address bus terminal of said processor and outputting a content of the extended register corresponding the selected address register to an information output terminal of said processor;
(iv) sequentially fetching an address outputted from said address bus terminal of said processor and a signal appearing on said information output terminal into an instruction tracer for said processor; and
(v) causing an instruction mnemonic and an oper-and access of each instruction code of said sequence of instruction codes to correspond to each other on the basis of said address outputted from said address bus terminal of said processor and fetched in said instruction tracer with reference to said signal appearing on said information output terminal and fetched in said instruction tracer, in the instruction tracing of said processor for an advanced read of read operands and for a post-write of write operands.

9. A microprocessor having a multi-stage pipeline structure, comprising:
an instruction decoding unit having an instruction decoder for decoding a received instruction code and having status indicating means having an output changing at a real time base when a predetermined instruction code, which can be used as an index in a program trace performed after a program to be tested has been executed, is decoded by said instruction decoder, said status indicating means maintaining said output when an instruction code other than said predetermined instruction code is decoded by said instruction decoder;
address generating means coupled to said instruction decoding unit to receive at least a portion of a decoded instruction code outputted from said instruction decoder for generating an address for reading or writing of an operand required by said decoded instruction code; and
bus control means including first register means coupled to said address generating means for temporarily holding said address for reading and/or writing of said operand required by said decoded instruction code and second register means coupled to said status indicating means for temporarily holding the output of said status indicating means when said decoded instruction code is outputted from said instruction decoder, said bus control means operating, when a bus cycle is started on the basis of said address held in said first register means, to output a content of said second register means to an external of said microprocessor in synchronism with an output timing of said address held in said first register means during a bus cycle period of said microprocessor,
whereby information outputted from said microprocessor including said address held in said first register means and said content of said second register means is sequentially stored as time-series data in a storage means, said time-series data is edited by an editing means in response to a discriminating means which discriminated whether the bus cycle of said microprocessor belongs to a bus cycle following an instruction on or before said predetermined instruction code for changing the output of said status indicating means or a bus cycle following an instruction on or after said predetermined instruction code, with reference to said content of said second register means stored in said storage means which indicates output information of said status indicating means.

10. A microprocessor having a multi-stage pipeline structure, comprising:
- a bus controller which includes an address bus interface part having a group of address registers selectively coupled to an external address bus for outputting an address to an external device of said microprocessor and a group of extended registers provided to said group of address registers in a one-to-one relation, a data bus interface part coupled to an internal data bus and also coupled to an external data bus for administering data communications between said microprocessor and the external device of said microprocessor, and a bus cycle control part for controlling the bus cycle of said microprocessor, the output of a bus status and input/output of signals to and from said microprocessor;
- an instruction queue coupled to said internal data bus for storing a plurality of instruction codes supplied and prefetched through said external data bus, said data bus interface part and said internal data bus;
- an instruction decoding unit having an instruction code register coupled to said instruction queue for latching an instruction code outputted from said instruction queue and an instruction decoder coupled to said instruction code register for decoding an instruction code latched in said instruction code register, said instruction decoder having a toggle flip-flop having an output changing at a real time base when a branch instruction code, which can be used as an index in a program trace performed after a program to be tested has been executed, is decoded by said instruction decoder, said toggle flip-flop maintaining said output when an instruction code other than said branch instruction code is decoded by said instruction decoder, said toggle flip-flop having said output coupled to said extended register group of said address bus interface so that the output of the toggle flip-flop is temporarily held in a selected extended register of said extended register group;
- a decoded instruction queue coupled to receive a decoded instruction code outputted from said instruction decoder for storing a plurality of decoded instruction codes;
- an execution unit coupled to receive a decoded instruction code outputted from said decoded instruction queue for executing the received instruction code and for outputting the result of the execution to said data bus interface part; and
- an address generator coupled to said internal data bus to receive an address information and also coupled to said instruction decoding unit to receive at least a portion of the decoded instruction code outputted from said instruction decoder for generating an address for reading and/or writing of an operand required by said decoded instruction code to said address register group of said address bus interface so that said address is temporarily held in a selected address register of said address register group,
- said bus controller operating, when a bus cycle is started on the basis of said address held in one selected address register of said address register group, to output a content of said selected address register to said external address bus and a content of an extended register corresponding to said selected address register to the external device of said microprocessor in synchronism with each other during bus cycle period of said microprocessor,
- whereby information outputted from said microprocessor including said addresses held in said address register group and said contents of said extended register group can be sequentially stored as time-series data, said time-series data is edited by an editing means in response to a discriminating means which discriminated whether the bus cycle of said microprocessor belongs to a bus cycle following an instruction on or before said predetermined instruction code for changing the output of said status indicating means or a bus cycle following an instruction on or after said predetermined instruction code, said contents of said extended register group indicating a status of the output of said toggle flip-flop.

* * * * *